US009815564B2

(12) United States Patent
Krug et al.

(10) Patent No.: US 9,815,564 B2
(45) Date of Patent: Nov. 14, 2017

(54) NON-PROPULSIVE UTILITY POWER (NPUP) GENERATION SYSTEM FOR PROVIDING FULL-TIME SECONDARY POWER DURING OPERATION OF AN AIRCRAFT

(71) Applicant: The Boeing Company, Chicago, IL (US)

(72) Inventors: David S. Krug, Kirkland, WA (US); Kamiar J. Karimi, Kirkland, WA (US); Thomas F. Currier, Lynnwood, WA (US); Andrew J. Bayliss, Marysville, WA (US); George M. Roe, Seattle, WA (US); Mark E. Liffring, Seattle, WA (US); Mark W. Lesyna, Everett, WA (US); Christopher M. Severns, Issaquah, WA (US); Andrew Johnson, Everett, WA (US)

(73) Assignee: The Boeing Company, Chicago, IL (US)

( * ) Notice: Subject to any disclaimer, the term of this patent is extended or adjusted under 35 U.S.C. 154(b) by 883 days.

(21) Appl. No.: 14/096,106

(22) Filed: Dec. 4, 2013

(65) Prior Publication Data

US 2015/0151847 A1 Jun. 4, 2015

(51) Int. Cl.
*B64D 41/00* (2006.01)
*H02J 9/06* (2006.01)
(Continued)

(52) U.S. Cl.
CPC ............. *B64D 41/00* (2013.01); *B60R 16/03* (2013.01); *B64D 13/00* (2013.01); *B64D 15/04* (2013.01); *H02J 9/06* (2013.01); *B64D 2221/00* (2013.01)

(58) Field of Classification Search
CPC ........ B64D 41/00; B64D 15/04; B64D 13/00; B64D 2221/00; H02J 9/06; B60R 16/03
(Continued)

(56) References Cited

U.S. PATENT DOCUMENTS 5,977,645 A 11/1999 Glennon
6,296,957 B1 10/2001 Graage
(Continued)

FOREIGN PATENT DOCUMENTS

EP 1099630 5/2001
EP 2213571 8/2010
WO 2013/142161 9/2013

OTHER PUBLICATIONS

The Boeing Company, "Final Report—An Advanced Concept Secondary Power Systems Study for an Advanced Transport Technology Aircraft"; NASA CR-112103, Prepared under contract NAS1-10893; pp. 1-155 (Aug. 1972).
(Continued)

Primary Examiner — Jared Fureman
Assistant Examiner — Michael Warmflash
(74) Attorney, Agent, or Firm — Thompson Hine LLP

(57) ABSTRACT

An aircraft may include at least one secondary power system requiring secondary power, at least two main engines, and at least three non-propulsive utility power (NPUP) generation systems. The NPUP generation systems may each be configured to provide full-time secondary power during operation of the aircraft. The NPUP generation systems may be configured to provide at least a portion of the secondary power required by the secondary power system.

11 Claims, 16 Drawing Sheets

(51) Int. Cl.
*B60R 16/03* (2006.01)
*B64D 13/00* (2006.01)
*B64D 15/04* (2006.01)

(58) Field of Classification Search
USPC .......................................................... 307/9.1
See application file for complete search history.

(56) References Cited

U.S. PATENT DOCUMENTS

| | | | |
|---|---|---|---|
| 7,950,606 | B2 | 5/2011 | Atkey et al. |
| 8,093,747 | B2 | 1/2012 | Pearson et al. |
| 8,118,253 | B1 | 2/2012 | Abarquero et al. |
| 8,232,670 | B2 | 7/2012 | Breit et al. |
| 8,657,227 | B1* | 2/2014 | Bayliss ............... H02J 4/00 244/134 D |
| 8,950,703 | B2 | 2/2015 | Bayliss et al. |
| 9,296,480 | B2* | 3/2016 | Boodaghians ....... B61D 35/007 |
| 2005/0006954 | A1* | 1/2005 | Bowman ............... B64D 41/00 307/9.1 |
| 2006/0138278 | A1* | 6/2006 | Gans ...................... B64D 41/00 244/58 |
| 2007/0158500 | A1 | 7/2007 | Sridhar et al. |
| 2007/0262644 | A1* | 11/2007 | Foch ........................ H02J 1/10 307/29 |
| 2008/0150356 | A1* | 6/2008 | Breit ....................... H02J 7/1423 307/9.1 |
| 2008/0277944 | A1 | 11/2008 | Schwarz et al. |
| 2009/0072080 | A1 | 3/2009 | Bhargava |
| 2010/0102625 | A1* | 4/2010 | Karimi ..................... B60L 1/00 307/9.1 |
| 2011/0133545 | A1 | 6/2011 | Pearson et al. |
| 2012/0232728 | A1* | 9/2012 | Karimi ..................... H02J 3/38 701/22 |
| 2013/0036730 | A1 | 2/2013 | Bruno et al. |
| 2013/0249321 | A1* | 9/2013 | Gao ......................... H02G 7/16 307/147 |
| 2014/0197681 | A1* | 7/2014 | Iwashima ............... B60R 16/03 307/9.1 |
| 2015/0047684 | A1* | 2/2015 | Mitchell ................. H01L 35/28 136/201 |
| 2015/0103447 | A1* | 4/2015 | Brouwer ................. H02H 7/00 361/1 |

OTHER PUBLICATIONS

Tanemura, K. and Hainline, B., "The Role of the Auxiliary Power Unit in Future Airplane Secondary Power Systems," SAE Technical Paper 730381, 1973; DOI: 10.4271/730381, published: Feb. 1, 1973 by SAE International in United States.
CA, Examination Report; Patent Application No. 2,865,768 (Oct. 5, 2015).
Hoffman et al.; "Advanced Secondary Power System for Transport Aircraft"; NASA Technical Paper 2463; pp. 1-38 (May 1985).
Feiner, Louis J.; "Power-by-Wire Aircraft Secondary Power Systems" IEEE 0-7803-1343-7/93, Digital Avionics Systems Conference, 12th DASC, pp. 439-444 (Oct. 25-28, 1993).
Shibata et al.; "Aircraft Secondary Power System Integration into Conceptual Design and its Application to More Electric System", SAE 2014 Aerospace Systems and Technology Conference; DOI: 10.4271/2014-01-2199 (Sep. 16, 2014).
CA, Office Action, Canadian Patent Application No. 2,865,768 (Sep. 22, 2016).
EP, European Search Report; European Patent Application No. 14196215.9; (Mar. 27, 2015).
"C-133 Cargomaster . . . ," Flight, p. 522-523 (Sep. 26, 1958), http://www.flightglobal.com/pdfarchive/view/1958/1958-1-%20-%200518.html.
"GTU-85-3 Operational Instructions and Trouble Shooting Procedures, Engineering Report No. LB-30114," Douglas Aircraft Company, Inc., Long Beach, CA (Apr. 1959).
*Aircraft Electrical Engienering*, G. Wakefield, Chapman & Hall Ltd., pp. 226, and 248-249 (1959).
Eelman, S. et al., "Fuel Cell APU's in Commercial Aircraft—An Assessment of SOFC and PEMFC Concepts," ICAS 2004, 24th International Congress of the Aeronautical Sciences (2004).
Mackay, A. et al., "Modelling of Fuel Cell APU Utilisation for Aircraft Applications," 8th Annual International Energy Conversion Engineering Conference, Nashville, TN (Jul. 25-28, 2010).
Pratt, J.W. et al., "Proton Exchange Membrane Fuel Cells for Electrical Power Generation On-Board Commercial Airplanes," Sandia Report SAND2011-3119, Sandia National Laboratories, Albuquerque, NM (May 2011).
*Principles and Practice of Aircraft Electrical Engineering*, H. Zeffert, George Newnes Limited, pp. 32-33 (1960).
Rajashekara, K. et al., "Hybrid Fuel Cell Power in Aircraft," IEEE Industry Applications Magazine, pp. 54-60 (Jul./Aug. 2008).
Raymond, E.T., "Secondary Power System Options for Future Military Aircraft," SAE Technical Paper Series, 801192, Aerospace Congress & Exposition, Los Angeles, CA (Oct. 13-16, 1980).
Second International Aeronautical Conference, New York, NY, pp. 446-449 (May 24-27, 1949).
EP, Extended European Search Report and Opinion, Patent Application No. 17151340.1, 9 pages (Apr. 7, 2017).
CA, Office Action, Patent Application No. 2,865,768, 3 pages (Jun. 5, 2017).

* cited by examiner ary utility power (NPUP) generation systems. Each NPUP generation system may be configured to provide full-time secondary power during operation of the aircraft.

NON-PROPULSIVE UTILITY POWER (NPUP) GENERATION SYSTEM FOR PROVIDING FULL-TIME SECONDARY POWER DURING OPERATION OF AN AIRCRAFT

FIELD

The disclosed system and method relate to an aircraft and, more particularly, to an aircraft having multiple non-propulsive utility power (NPUP) generation systems each configured to provide full-time secondary power during operation of the aircraft.

BACKGROUND

Non-propulsive aircraft systems are typically driven by a combination of different secondary power types such as hydraulic, pneumatic, electrical and mechanical power, which may all be extracted from an aircraft's main engines using various approaches. For example, pneumatic power may be provided by extracting bleed air from various compressor stages of the main engine, and mechanical power may be extracted from a gearbox driven by the output shaft of the main engine. However, extracting energy reduces the engine total efficiency and thereby increases the specific fuel consumption of the main engine. Moreover, the machinery used to extract energy from the main engine may need to be placed within very confined areas of the aircraft, where packaging space is limited. Specifically, the machinery may be placed within the main engine and an associated nacelle that surrounds the main engine. In addition, the machinery may also result in an increased inner to outer wall thickness of the nacelle. Increasing the inner to outer wall thickness will in turn increase the weight and drag associated with the nacelle. The machinery also adds cost and weight to the aircraft as well.

One or more auxiliary power units (APUs) may be included in the aircraft to provide non-propulsive power. However, the APUs are typically treated as a back-up power source, and are infrequently used while the aircraft is in flight. For example, in one approach the APU may serve as an on-line emergency electrical power source in the event a main engine generator or one of the main engines become inoperative.

SUMMARY

In one embodiment, an aircraft may include at least one secondary power system requiring secondary power, at least two main engines, and at least three non-propulsive utility power (NPUP) generation systems. The NPUP generation systems may each be configured to provide full-time secondary power during operation of the aircraft. The NPUP generation systems may be configured to provide at least a portion of the secondary power required by the secondary power system.

In another embodiment, a method of providing secondary power in an aircraft may be disclosed, where the aircraft may include at least one secondary power system and at least two main engines. The secondary power system may require the secondary power. The method may include generating at least a portion of the secondary power required by the secondary power system by at least three non-propulsive utility power (NPUP) generation systems. Each NPUP generation system may be configured to provide full-time secondary power during operation of the aircraft.

In yet another embodiment, an aircraft may include a plurality of electrical power systems requiring electrical power, at least one hydraulic power system requiring hydraulic power, at least two main engines, and at least two non-propulsive utility power (NPUP) generation systems. The NPUP generation systems may each be configured to provide full-time secondary power during operation of the aircraft. The NPUP generation systems may be configured to provide at least a portion of the electrical power required by the electrical systems.

Other objects and advantages of the disclosed method and system will be apparent from the following description, the accompanying drawings and the appended claims.

DETAILED DESCRIPTION

Figure 1:
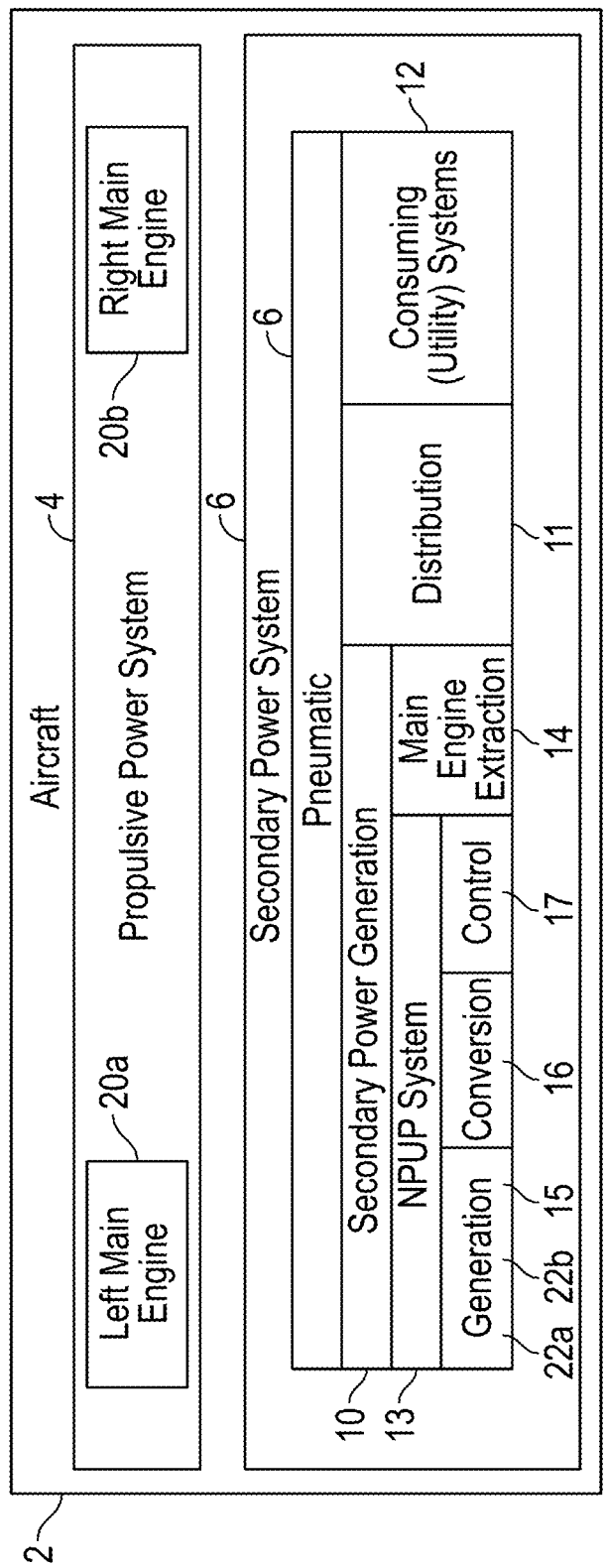
FIG. 1 is a block diagram of an embodiment of the disclosed aircraft including a propulsive power system and a secondary power system.

As shown in FIG. 1, the disclosed aircraft, generally designated 2, may include a propulsive power system 4 and a secondary power system 6. The propulsive power system 4 may be used to provide propulsive thrust to the aircraft 2, and the secondary power system 6 may be used to provide secondary power to the aircraft 2. Secondary power may also be referred to as non-propulsive power or utility power. The propulsive power system 4 may include two main engines, which are illustrated in FIG. 1 as a left main engine 20a and a right main engine 20b. It should be noted that while two main engines are illustrated, it is to be understood that in another embodiment, the aircraft 2 may include more than two main engines as well. The secondary power system 6 may include at least one secondary power generation system 10, at least one secondary distribution system 11, and at least one utility or consumption system 12.

The secondary power generation system 10 may include a non-propulsive utility power (NPUP) system 13 and a main engine extraction system 14. The main engine extraction system 14 may be used to extract power from the main engines 20a, 20b. The NPUP system 13 may include a power generation system 15, a power conversion system 16, and a power control system 17. In one embodiment, the power generation system 15 may include at least two NPUP generation sources, which are illustrated as NPUP generation source 22a and NPUP generation source 22b. Although FIG. 1 illustrates two NPUP generation sources 22a, 22b, it is to be understood that the power generation system 15 may also include three NPUP generation sources (illustrated in FIGS. 5-7 and 12-15) or four NPUP generation sources (illustrated in FIGS. 8-9 and 16) as well. The NPUP generation sources 22a, 22b may be any device capable of providing non-propulsive or secondary energy to the aircraft 2 such as, for example, a gas turbine engine, an internal combustion engine, or a fuel cell. In one non-limiting embodiment, the NPUP generation sources 22a, 22b may each be coupled to an energy storage system (not illustrated). The energy storage system may include any type of device capable of storing energy such as, for example, a flywheel, a capacitor, a hydraulic accumulator, a pneumatic accumulator, or a battery, and may be used during load peaking of the aircraft 2.

Figure 2:
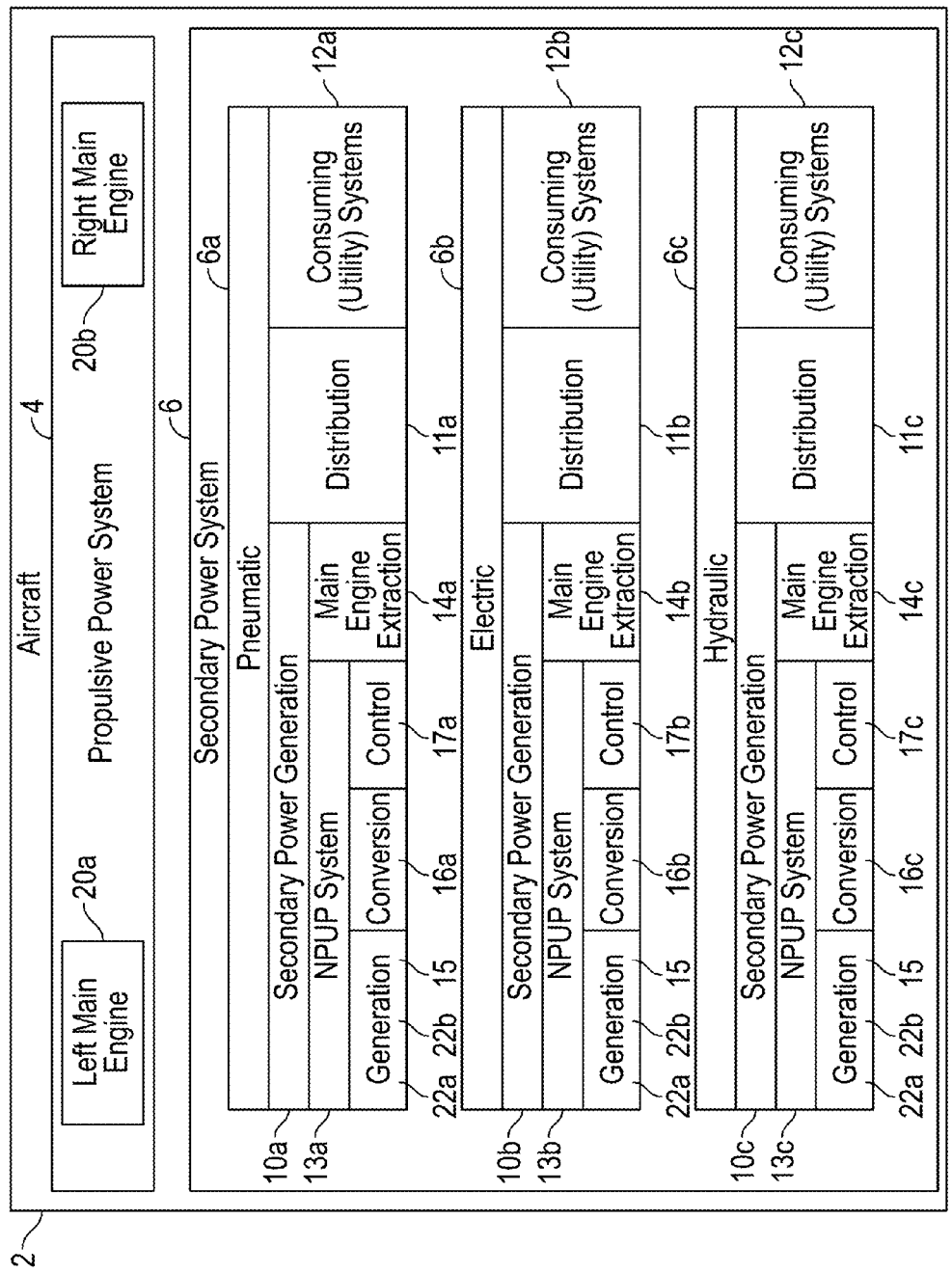
FIG. 2 is a block diagram of the propulsive power system and the secondary power system shown in FIG. 1, where the secondary power system may include a pneumatic power system, an electrical power system, and a hydraulic power system.

Referring to FIG. 2, in one embodiment the secondary power system 6 may include a pneumatic power system 6a, an electrical power system 6b, and a hydraulic power system 6c. It should be noted that the illustration of FIG. 2 is exemplary in nature, and the secondary power system 6 may include other types of power systems as well. For example, in one embodiment the secondary power system 6 may also include a mechanical power system (not shown) for providing mechanical shaft power. The NPUP generation sources 22a, 22b may be used to provide power to the pneumatic power system 6a, the electrical power system 6b, and the hydraulic power system 6c. In other words, the power generation system 15 may be shared among the various secondary power systems. However, the pneumatic power system 6a, the electrical power system 6b, and the hydraulic power system 6c may each include a unique power conversion system, power control system and main engine extraction system.

Figure 3:
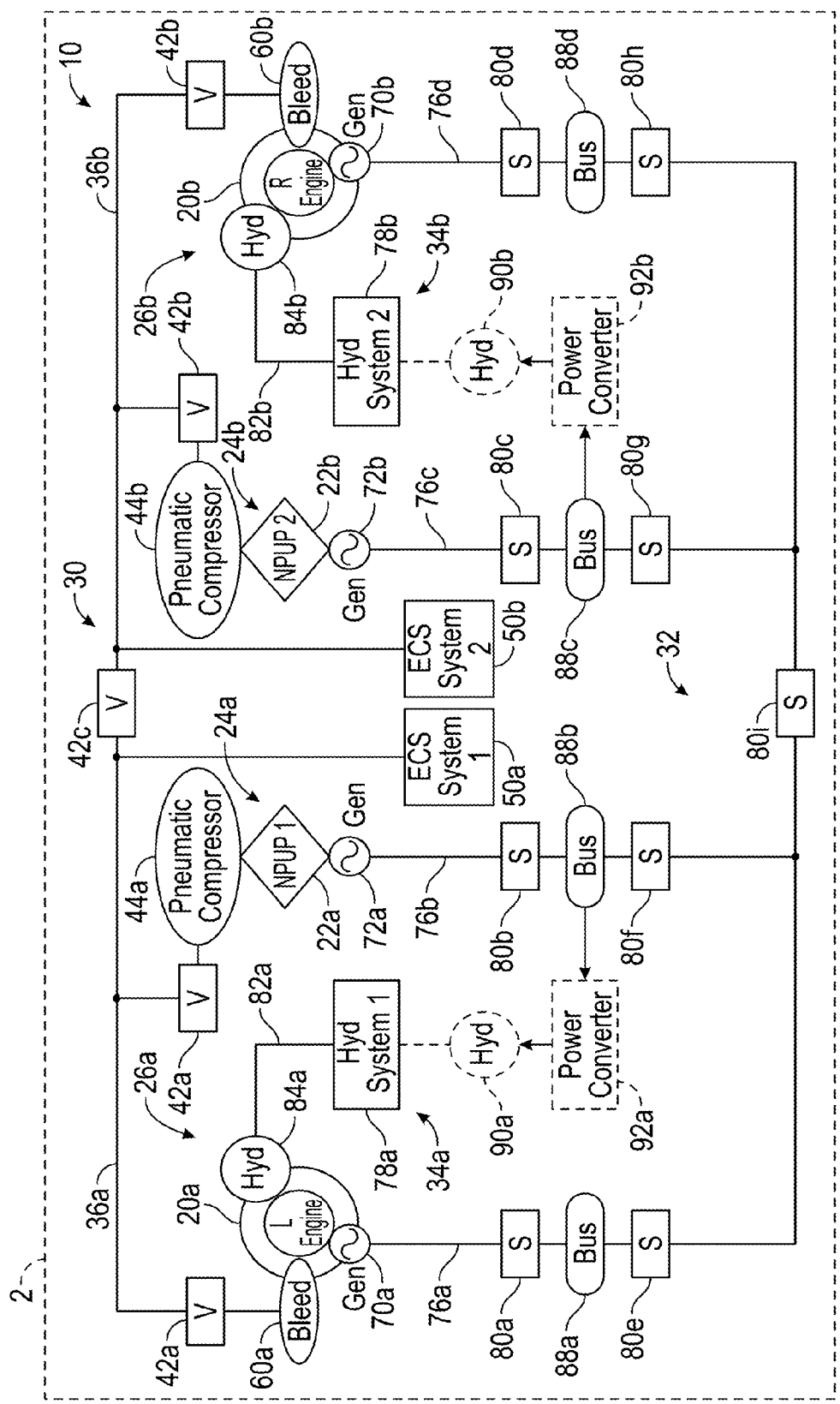
FIG. 3 is a schematic view an embodiment of the disclosed secondary power system in the aircraft, where the secondary power system may include two non-propulsive utility power (NPUP) generation sources, a pneumatic system, an electrical system, and a hydraulic system.

In one embodiment, the pneumatic power system 6a may include a pneumatic power conversion system 16a and a pneumatic power control system 17a. The pneumatic power conversion system 16a may include at least two pneumatic compressors, which are illustrated in FIG. 3 as pneumatic compressors 44a, 44b. The pneumatic control system 17a may include various controller devices (not shown) such as, for example, electronic circuitry and microprocessors that may be used to control the amount of pneumatic power extracted from the NPUP generation sources 22a, 22b. For example, the pneumatic control system 17a may control the position of one or more of pneumatic valves 42a, 42b, 43c (shown in FIG. 3). A pneumatic main engine extraction system 14a may include componentry (not shown) for extracting bleed air from various compressor stages (not shown) of the main engines 20a, 20b.

The electrical power system 6b may include an electrical power conversion system 16b and an electrical power control system 17b. The electrical power conversion system 16b may include at least two electrical generators each coupled to one of the NPUP generation sources 22a, 22b, which are illustrated in FIG. 3 as a left NPUP generator 72a and a right NPUP generator 72b. The electrical control system 17b may also include various controller devices (not shown) for controlling the amount of electrical power extracted from the NPUP generation sources 22a, 22b. For example, the electrical control system 17b may be used to engage the NPUP generators 72a, 72b (shown in FIG. 3). The electrical main engine extraction system 14b may include a left propulsive engine generator 70a and a right propulsive engine generator 70b, which are also shown in FIG. 3.

Figure 7:
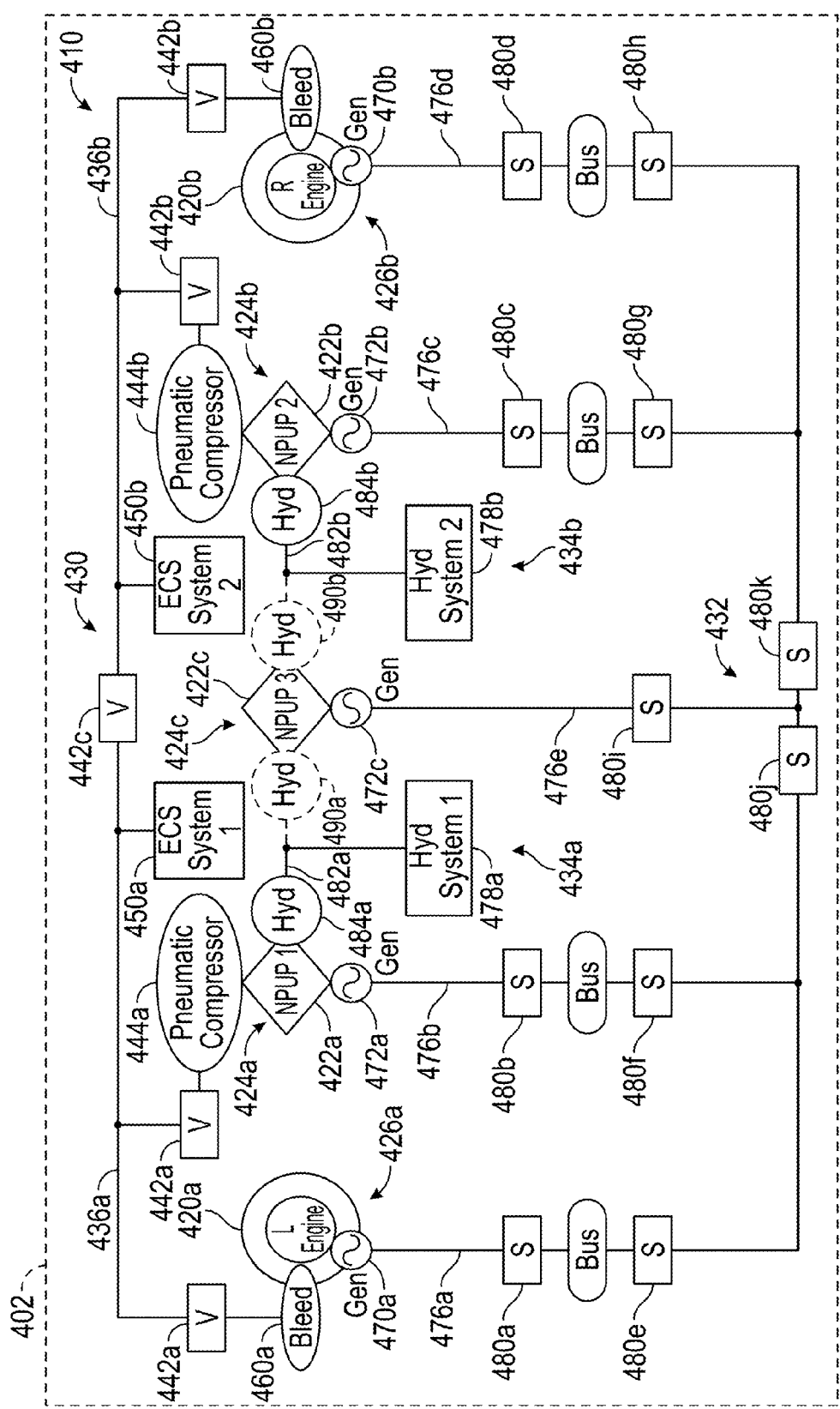
FIG. 7 is a schematic view of yet another embodiment of the secondary power system shown in FIG. 3, where the secondary power system includes three NPUP generation sources.

The hydraulic power system 6c may include a hydraulic power conversion system 16c and a hydraulic power conversion system 17c. The hydraulic power conversion system 16c may include at least two NPUP hydraulic pumps, which are illustrated in FIG. 7 as left NPUP hydraulic pump 484a and right NPUP hydraulic pump 484b. The hydraulic control system 17b may also include various controller devices (not shown) for controlling the amount of hydraulic power extracted from the NPUP generation sources 22a, 22b. For example, the hydraulic control system 17c may be used to activate the NPUP hydraulic pumps 484a, 484b (shown in FIG. 7). A hydraulic main engine extraction system 14c may include a left propulsive engine hydraulic pump 84a and a right propulsive engine hydraulic pump 84b (shown in FIG. 3).

Referring to FIG. 2, the pneumatic power system 6a, the electrical power system 6b, and the hydraulic power system 6c may also each include a unique secondary distribution system and a unique consumption system as well. For example, the pneumatic power system 6a may include a pneumatic distribution system 11a. The pneumatic distribution system 11a may include at least two pneumatic distribution channels, which are illustrated in FIG. 3 as a left pneumatic distribution channel 36a, and a right pneumatic distribution channel 36b. The pneumatic power system 6a may also include a consumption system 12a such as, for example, an environmental control system (ECS), which is illustrated in FIG. 3 as ECSs 50a, 50b. The electrical power system 6b may include an electrical distribution system 11b. The electrical distribution system 11b may include a plurality of electrical busses, which are illustrated in FIG. 3 as electrical busses 76a-76d. The electrical power system 6b may also include an electrical consumption system 12b which may consume electrical power. Some examples of the electrical consumption system 12b include, but are not limited to, cabin systems, galley systems, and flight deck avionics systems. The hydraulic power system 6c may include a hydraulic distribution system 11c, which is illustrated in FIG. 3 as left hydraulic distribution channel 82a and right hydraulic distribution channel 82b. The hydraulic power system 6c may also include a hydraulic consumption system 12c such as, for example, actuators for flight controls and landing gear. The hydraulic power system 6c consumes hydraulic power, and is illustrated in FIG. 3 as a left hydraulic system 78a and a right hydraulic system 78b.

Referring to FIG. 3, a schematic illustration of the aircraft 2 is shown. The aircraft 2 may include a left NPUP generation system 24a, a right NPUP generation system 24b, a left main engine extraction system 26a, and a right main engine extraction system 26b. The left NPUP generation system 24a may include the left NPUP generation source 22a. Similarly, the right NPUP generation system 24b may include the right NPUP generation source 22a. Each of the NPUP generation systems 24a, 24b may operate independently with respect to each another. That is, each of the NPUP generation systems 24a, 24b may be installed on the aircraft 2 as an independent system, where the left NPUP generation system 24a may be functionally and physically isolated from the right NPUP generation system 24b. The NPUP generation systems 24a, 24b may each be utilized as full-time secondary power generation systems during operation of the aircraft 2. This means that the NPUP generation systems 24a, 24b provide secondary power when the aircraft 2 is on the ground as well as during all phases of flight. Thus, the main engines 20a, 20b may not typically be used as the primary source of secondary power.

The aircraft 2 may include at least two NPUP generation systems 24a, 24b in order to provide redundancy, which may be required for certification purposes. For example, one or both of the NPUP generation systems may be operated substantially under capacity during normal operation of the aircraft 2. Thus, if a transient condition occurs that affects operation of the right NPUP generation system 24b, then the left NPUP generation system 24a or the main engines 20a, 20b may be used as an alternate, independent source of power capable of maintaining aircraft essential loads. An aircraft essential load may be defined as a load required for certification of the aircraft 2. Likewise, a non-essential load may be defined as a load that is not required for certification of the aircraft 2.

The NPUP generation systems 24a, 24b may generate at least a portion of the secondary power required by the consumption systems 12 (shown in FIGS. 1-2) located within the aircraft 2. As described above, the consumption systems 12 may include, but are not limited to, hydraulic systems, flight control systems, fuel systems, landing gear systems, the ECSs 50a and 50b, flight deck avionics systems, cabin systems, galley systems, and lavatory systems. The NPUP generation systems 24a, 24b may also be used to drive aircraft wheels (not shown) when the aircraft 2 is taxiing. In the exemplary embodiment as shown in FIG. 3, the aircraft 2 includes a pneumatic system 30, an electrical system 32, and two hydraulic systems 34a, 34b. The pneumatic system 30 may be used to provide pneumatic power to the ECSs 50a, 50b. The electrical system 32 may be used to provide electrical power to various electrical consumption systems (not illustrated in FIG. 3) such as, for example, flight control systems and flight deck avionics systems that may be coupled to independent electrical busses 88a-88d. Similarly, the hydraulic systems 34a, 34b may each be used to provide hydraulic power to the corresponding left and right hydraulic systems 78a, 78b.

Although FIG. 3 illustrates the aircraft 2 including the pneumatic system 30, the electrical system 32, and two hydraulic systems 34a, 34b, it is to be understood that the aircraft 2 may include other system configurations as well. For example, in the embodiments as shown in FIGS. 10-16, the aircraft only includes an electrical system and a hydraulic system, and are described in greater detail below. It should also be noted that while two hydraulic systems 34a, 34b are illustrated in FIG. 3, the aircraft 2 may only include one hydraulic system as well. Moreover, in another embodiment the aircraft 2 may include a third hydraulic system (not shown) as well, which may be powered by an electric, mechanical shaft or pneumatic air source.

The NPUP generation systems 24a, 24b may be used to generate at least a portion of the secondary or non-propulsive power required by the aircraft 2. Specifically, depending on the specific architecture of the secondary power system 10, the NPUP generation systems 24a, 24b may generate anywhere from about fifty percent to about one hundred percent of the secondary power required by the consumption systems 12 (shown in FIGS. 1-2) located within the aircraft 2. The remaining secondary power not provided by the NPUP generation systems 24a, 24b may be extracted from the main engines 20a, 20b by the main engine extraction systems 26a, 26b. However, in some embodiments the NPUP generation systems may be used to provide substantially all of the secondary power required by the consumption systems 12 (shown in FIGS. 1-2) located within the aircraft 2, thus generally eliminating the need to extract energy from the main engines 20a, 20b. Specifically, in the embodiments as shown in FIGS. 8, 13, and 15-16, the NPUP generation systems provide substantially all of the secondary or non-propulsive power required by the aircraft.

In the embodiment as shown in FIG. 3, the NPUP generation systems 24a, 24b may provide between about fifty percent to about ninety percent of the secondary power required by the consumption systems 12 (shown in FIGS. 1-2) located within the aircraft 2 during normal operation. The specific percentage of secondary power supplied by the NPUP generation systems 24a, 24b may vary based on the power consumption of the aircraft 2. Some factors that affect the power consumption of the aircraft 2 include, but are not limited to, the flight phase of the aircraft 2 (e.g., takeoff, climb, cruise, descent, etc.), various loads on the aircraft 2, and environmental conditions. Some examples of environmental conditions that may affect the power consumption include, but are not limited to, icing conditions, ambient temperature, moisture, and precipitation. Some examples of loads on the aircraft 2 that may affect the power consumption include, but are not limited to, galley ovens, heaters and refrigeration units, lavatories, flight controls, avionics, environmental control systems, and lighting.

The pneumatic system 30 may include the left pneumatic distribution channel 36a and a right pneumatic distribution channel 36b. Compressed air may be supplied to the pneumatic distribution channels 36a, 36b by the respective pneumatic compressors 44a, 44b. Specifically, the left pneumatic compressor 44a may provide air to the left pneumatic distribution channel 36a, and the right pneumatic compressor 44b may provide air to the right pneumatic distribution channel 36*b*. Each pneumatic compressor 44*a*, 44*b* may be integrated or coupled by a gearbox (not shown) to one of the NPUP generation sources 22*a*, 22*b*. Specifically, the left NPUP generation source 22*a* may drive the left pneumatic compressor 44*a*, and the right NPUP generation source 22 may drive the right pneumatic compressor 44*b*.

The pneumatic compressors 44*a*, 44*b* may be used to supply compressed air to respective ECSs 50*a*, 50*b*. Specifically, the left pneumatic compressor 44*a* may be connected to the left ECS 50*a* through the left pneumatic distribution channel 36*a*, and the right pneumatic compressor 44*b* may be connected to the right ECS 50*b* though the right pneumatic distribution channel 36*b*. The pneumatic valves 42*a*, 42*b*, 42*c* may be provided for controlling the amount of compressed air supplied to the ECSs 50*a*, 50*b*. Specifically, the pneumatic valves 42*a* may control the amount of compressed air supplied to the ECS 50*a*, the pneumatic valves 42*b* may control the amount of compressed air supplied to the ECS 50*b*, and a centrally located pneumatic valve 42*c* may be provided to cross-connect the left pneumatic distribution channel 36*a* with the right pneumatic distribution channel 36*b*.

In one embodiment, bleed or compressed air 60*a*, 60*b* may be extracted from compressors (not shown) of the main engines 20*a*, 20*b*. The compressed air 60*a*, 60*b* may supplement the air provided by the pneumatic compressors 44*a*, 44*b* to the ECSs 50*a*, 50*b*. The compressed air 60*a*, 60*b* extracted from the main engines 20*a*, 20*b* may be at an elevated temperature, and may therefore be cooled by a heat exchanger (not shown in FIG. 3) before flowing to the ECSs 50*a*, 50*b*. However, the pneumatic compressors 44*a*, 44*b* may provide a majority of the air required by the ECSs 50*a*, 50*b*. In one embodiment, the compressed air 60*a*, 60*b* may be used for wing ice protection. Specifically, the compressed air 60*a* may be directed through a left air duct within a leading edge of a left wing (not shown) of the aircraft 2, and the compressed air 60*b* may be directed through a right air duct within a leading edge of a right wing (not shown) of the aircraft 2. Each air duct includes holes that direct the hot compressed air to an inside surface of one of the wings, thus preventing the formation of ice. Alternatively, in another embodiment, the wing ice protection system may be electrical. Heating pads or elements may be bonded to an interior surface of the leading edges of the left and right wings (not shown) to melt ice.

Figure 4:
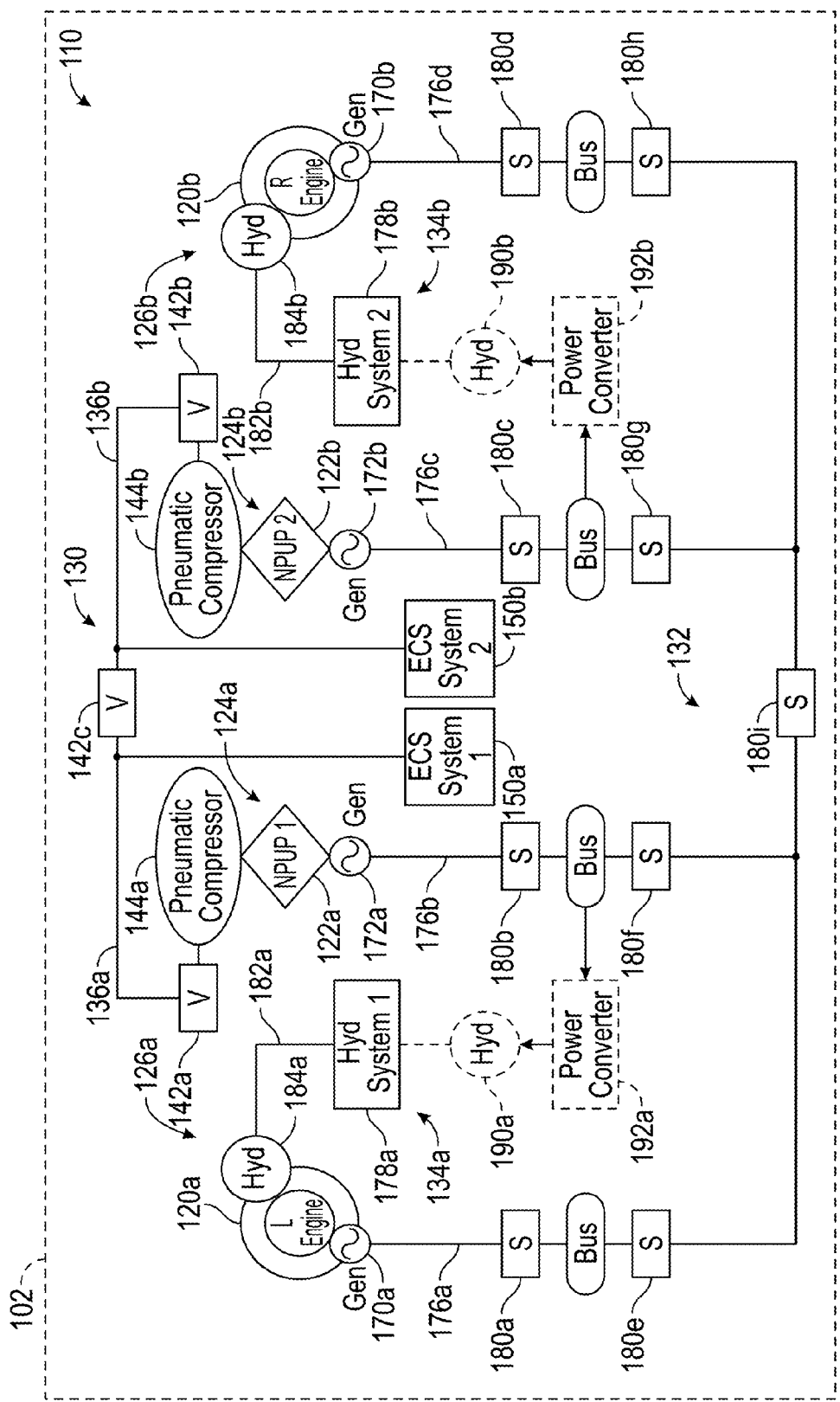
FIG. 4 is a schematic view of another embodiment of the secondary power system shown in FIG. 3.

In the exemplary embodiment as shown in FIG. 3, the main engines 20*a*, 20*b* may be pneumatically started based on the air supplied to the pneumatic system 30 from the pneumatic compressors 44*a*, 44*b*. Specifically, compressed air from the pneumatic distribution channels 36*a*, 36*b* may be fed to starter turbines (not shown) of the main engines 20*a*, 20*b*. The starter turbines consequently rotate, thus producing a mechanical shaft output transmitted to shafts (not shown) of the main engines 20*a*, 20*b* to be started. Although a pneumatic engine start is discussed, it is to be understood that other approaches may be used to start the main engines 20*a*, 20*b* as well. For example, the main engines may be started by an electrical starter (not shown), a hydraulic motor (not shown), a jet fuel starter (not shown), or a ground pneumatic source (e.g., a start cart). In one embodiment, the main engines may be started using main engine starter generators, which is discussed in the embodiment as shown in FIG. 4.

The electrical system 32 may include the left main engine generator 70*a*, the right main engine generator 70*b*, the left NPUP generator 72*a*, the right NPUP generator 72*b*, electrical power feeders 76*a*-76*d*, and the electrical switches 80*a*-80*i*. The left main engine generator 70*a* may be mechanically coupled to the left main engine 20*a*, and the right main engine generator 70*b* may be mechanically coupled to the right main engine 20*b* by a gearbox (not shown). Alternatively, in another embodiment, the main engine generators 70*a*, 70*b* may be integrated with one of the main engines 20*a*, 20*b*. Likewise, the NPUP generators 72*a*, 72*b* may be integral or coupled to a respective one of the NPUP generation sources 22*a*, 22*b*.

The aircraft 2 may include multiple independent electrical main engine generators 70*a*, 70*b*, NPUP generators 72*a*, 72*b*, and associated power feeders 76*a*-76*b* in order to meet certification requirements and for safety reasons. For example, in the embodiment as shown in FIG. 3 the aircraft 2 includes four independent generators and power feeders (e.g., electrical main engine generators 70*a*, 70*b*, NPUP generators 72*a*, 72*b*, and associated power feeders 76*a*-76*b*). The switches 80*a*-80*i* may be used to route electrical power to specific electrical busses 88*a*-88*d* located on the aircraft 2. The electrical busses 88*a*-88*d* may be used to transport electrical power to various electrical consumption systems (not illustrated in FIG. 3) that may be coupled to the specific electrical busses 88*a*-88*d*. The aircraft 2 may include independent electrical busses 88*a*-88*d* for certification requirements and safety reasons.

Independent power generation systems may be capable of powering aircraft essential electrical loads required for certification of the aircraft 2. Some or all of the independent power generation systems may be capable of powering both essential electrical loads and non-essential electrical loads. For example, in the embodiment as shown in FIG. 3, the aircraft 2 includes four independent power generation systems, namely the two main engine generators 70*a*, 70*b* and the two NPUP generators 72*a*, 72*b*. The switches 80*e*-80*i* may be used to route power to the various electrical busses 88*a*-88*d* on the aircraft 2 in the event one of the main engine generators 70*a*, 70*b* or the NPUP generators 72*a*, 72*b* become inoperative.

The NPUP generators 72*a*, 72*b* may be rated to generate substantially all of the power required by the electrical system 32 as well as all of the essential and non-essential electrical loads on the aircraft 2. However, the main engine generators 70*a*, 70*b* may be used as a redundant electrical power source rated to only power essential loads. For example, in one embodiment, the main engine generators 70*a*, 70*b* may be sized to power the essential aircraft loads if a transient condition occurs which may affect operation of the NPUP generators 72*a*, 72*b*. Alternatively, in another embodiment, the main engine generators 70*a*, 70*b* may be sized to power the essential and non-essential loads respectively in the event a transient condition occurs which may affect operation of the NPUP generators 72*a*, 72*b*. It is to be understood that while FIG. 3 illustrates two main engine generators being used as redundant power, in other embodiments the NPUP generators may be used to power substantially all of the electrical loads within the aircraft, which are described in FIGS. 8-9, and 13-16.

The left hydraulic system 34*a* may include a left hydraulic system 78*a* connected to a left main engine hydraulic pump 84*a* via a left hydraulic distribution channel 82*a*, and the right hydraulic system 34*b* may include a right hydraulic system 78*b* connected to a right main engine hydraulic pump 84*b* via a right hydraulic distribution channel 82*b*. The main engine hydraulic pumps 84*a*, 84*b* may be integrated or coupled by a gearbox (not shown) to one of the main engines 20*a*, 20*b*. Specifically, the left main engine 20*a* may drive the main engine hydraulic pump 84*a*, and the right main engine 20b may drive the right main engine hydraulic pump 84b. The main engine hydraulic pumps 84a, 84b may be used to supply hydraulic power to the hydraulic systems 34a, 34b. In the embodiment as shown in FIG. 3, the main engine hydraulic pumps 84a, 84b may be rated to provide substantially all of hydraulic power required by the aircraft 2. Specifically, the left main engine hydraulic pump 84a may be used to provide the hydraulic power required by the left hydraulic system 78a, and the right main engine hydraulic pump 84b may be used to provide the hydraulic power required by the left hydraulic system 78b.

In one embodiment, the electric hydraulic pumps 90a, 90b may be used to supplement the main engine hydraulic pumps 84a, 84b for periods of time when the main engine hydraulic pumps 84a, 84b are inoperative, or during high demand conditions. The electric hydraulic pumps 90a, 90b may be optional, and are illustrated in phantom line. The NPUP generators 72a, 72b may be used to provide electrical power to the electric hydraulic pumps 90a, 90b. Specifically, electrical power may be provided to the left electric hydraulic pump 90a via a left power converter 92a, and electrical power to may be provided to the right electric hydraulic pump 90b via a right power converter 92b. The power converters 92a, 92b may be any type of device for converting electrical power from one form to another such as an AC to DC converter, or a voltage converter for changing voltage values.

FIG. 4 illustrates another embodiment of the secondary power system 110. The aircraft 102 may include a left NPUP generation system 124a, a right NPUP generation system 124b, a left main engine extraction system 126a, and a right main engine extraction system 126b. Similar to the embodiment as shown in FIG. 3, the secondary power system 110 may include a left aircraft main engine 120a, a right aircraft main engine 120b, two NPUP generation sources 122a, 122b, a pneumatic system 130, an electrical system 132, and two hydraulic systems 134a, 134b. The NPUP generation systems 124a, 124b may provide between about sixty percent to about ninety percent of the secondary power required by the consumption system 12 (shown in FIGS. 1-2) located within the aircraft 102 during normal operation. In the exemplary embodiment as shown in FIG. 4, the main engines 120a, 120b may be started by an electrical starter, a hydraulic motor, a jet fuel starter, a ground pneumatic source, or main engine starter generators 170a, 170b.

The pneumatic system 130 may include a left pneumatic distribution channel 136a, a right pneumatic distribution channel 136b, and a plurality of pneumatic valves 142a-142c. Compressed air may be supplied to the pneumatic distribution channels 136a, 136b by respective pneumatic compressors 144a, 144b. The pneumatic compressors 144a, 144b may be used to supply the air required by the ECSs 150a, 150b. Unlike the embodiment as shown in FIG. 3, compressed air may not be bled from compressors (not shown) of the main engines 120a, 120b. Instead, the pneumatic compressors 144a, 144b may provide substantially all of the compressed air required by the ECSs 150a, 150b. Since compressed air is not bled from the compressors, other devices, such as fluid based or electromechanical de-icers, heater pads or elements may be located on the left and right wings (not shown) and used for wing ice protection.

The electrical system 132 includes the left main engine generator 170a, the right main engine generator 170b, a left NPUP generator 172a, a right NPUP generator 172b, electrical power feeders 176a-176d, and a plurality of electrical switches 180a-180i. The NPUP generators 172a, 172b may be rated to generally provide power to substantially all of the electrical loads on the aircraft 102. However, similar to the embodiment as shown in FIG. 3, the main engine generators 170a, 170b may be used as a redundant power source rated to only power essential loads. For example, in one embodiment, the main engine generators 170a, 170b may be sized to support starting of the main engines 120a, 120b. In another embodiment, the main engine generators 170a, 170b may be sized to support aircraft essential loads if the NPUP generators 172a, 172b are inoperative. Alternatively, in another embodiment, the main engine generators 170a, 170b may be sized to support aircraft essential loads and non-essential loads in the event the NPUP generators 172a, 172b are inoperative.

The left hydraulic system 178a may be connected to a left main engine hydraulic pump 184a via a left hydraulic distribution channel 182a and, and the right hydraulic system 178b may be connected to a right main engine hydraulic pump 184b via a right hydraulic distribution channel 182b. The main engine hydraulic pumps 184a, 184b may be rated to generally provide substantially all of the hydraulic power required by the aircraft 102. Specifically, the left main engine hydraulic pump 184a may be used to provide the hydraulic power required by the left hydraulic system 178a, and the right main engine hydraulic pump 184b may be used to provide the hydraulic power required by the left hydraulic system 178b. In one embodiment, electric hydraulic pumps 190a, 190b may be used to supplement the main engine hydraulic pumps 184a, 184b in the event the main engine hydraulic pumps 184a, 184b are inoperative, or during high demand conditions. The NPUP generators 172a, 172b may be used to provide electrical power to the electric hydraulic pumps 190a, 190b. Specifically, electrical power may be provided to the left electric hydraulic pump 190a via a power converter 192a and to the right hydraulic pump 190b via a right power converter 192b.

Figure 5:
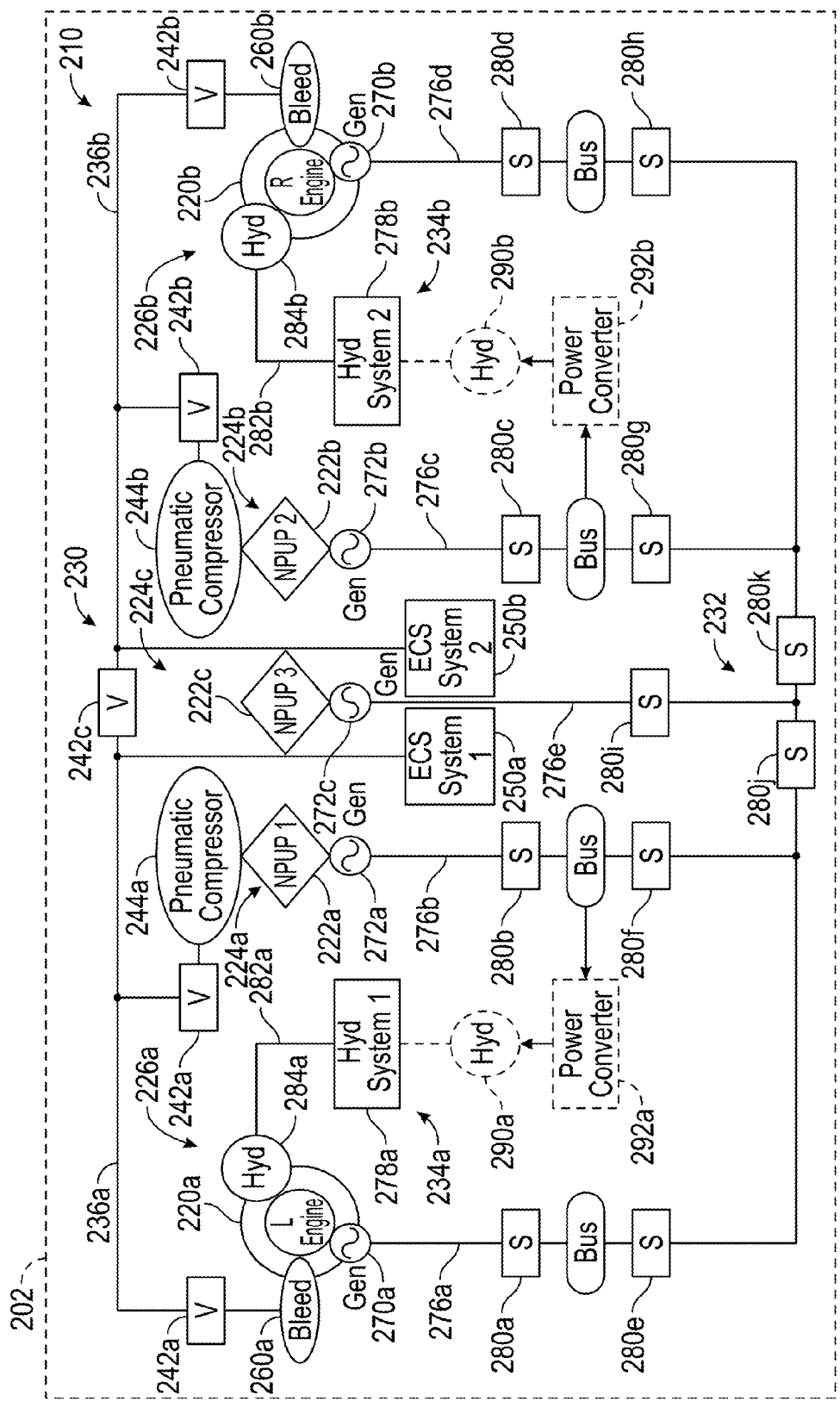
FIG. 5 is a schematic view of yet another embodiment of the secondary power system shown in FIG. 3, where the secondary power system includes three NPUP generation sources.

FIG. 5 illustrates yet another embodiment of the secondary power system 210. The aircraft 202 may include a left NPUP generation system 224a, a right NPUP generation system 224b, a central NPUP generation system 224c, a left main engine extraction system 226a, and a right main engine extraction system 226b. Similar to the embodiment as shown in FIG. 3, the secondary power system 210 may include a left aircraft main engine 220a, a right aircraft main engine 220b, a pneumatic system 230, an electrical system 232, and hydraulic systems 234a, 234b. The secondary power system 210 also includes three NPUP generation sources 222a, 222b, and 222c. The NPUP generation systems 224a-224c may provide between about sixty percent to about ninety percent of the secondary power required by the consumption system 12 (shown in FIGS. 1-2) located within the aircraft 202 during normal operation. In the exemplary embodiment as shown in FIG. 5, the main engines 220a, 220b may be pneumatically started based on the air supplied to the pneumatic system 230 from pneumatic compressors 244a, 244b.

The pneumatic system 230 may include a left pneumatic distribution channel 236a, a right pneumatic distribution channel 236b, and pneumatic valves 242a-242c. Compressed air may be supplied to the pneumatic distribution channels 236a, 236b by respective pneumatic compressors 244a, 244b. The pneumatic compressors 244a, 244b may be used to supply air to respective ECSs 250a, 250b. Similar to the embodiment as shown in FIG. 3, compressed air 260a, 260b may be extracted from compressors (not shown) of the main engines 220a, 220b. The compressed air 260a, 260b may supplement the air provided by the pneumatic compressors 244a, 244b to the ECSs 250a, 250b. However, the pneumatic compressors 244a, 244b may provide substantially all of the air to the ECSs 250a, 250b under normal operating conditions. In one embodiment, the compressed air 260a, 260b may be used for wing ice protection.

The electrical system 232 may include a left main engine generator 270a, a right main engine generator 270b, a left NPUP generator 272a, a right NPUP generator 272b, a central NPUP generator 272c, power feeders 276a-276e, and electrical switches 280a-280k. The left NPUP generation source 222a and the right NPUP generation source 222b act as primary power sources for secondary power. The centrally located NPUP generation source 222c may be smaller in size when compared to the two NPUP generation sources 222a, 222b. The NPUP generators 272a, 272b may be rated to generally provide power to substantially all of the electrical loads on the aircraft 202, and the third NPUP generator 272c may support essential loads. The main engine generators 270a, 270b may be sized to support essential loads. The main engine generators 270a, 270b may be utilized only after the two primary NPUP generation sources 222a, 222b or the NPUP generators 272a, 272b have become inoperative.

The left hydraulic system 278a may be connected to a left main engine hydraulic pump 284a via a left hydraulic distribution channel 282a and, and the right hydraulic system 278b may be connected to a right main engine hydraulic pump 284b via a right hydraulic distribution channel 282b. The main engine hydraulic pumps 284a, 284b may be rated to provide substantially all of hydraulic power required by the aircraft 202. Specifically, the left main engine hydraulic pump 284a may be used to provide the hydraulic power required by the left hydraulic system 278a, and the right main engine hydraulic pump 284b may be used to provide the hydraulic power required by the left hydraulic system 278b. In one embodiment, electric hydraulic pumps 290a, 290b may be used to supplement the main engine hydraulic pumps 284a, 284b in the event the main engine hydraulic pumps 284a, 284b are inoperative, or during high demand conditions. The NPUP generators 272a, 272b may be used to provide electrical power to the electric hydraulic pumps 290a, 290b. Specifically, electrical power may be provided to the left electric hydraulic pump 290a via a power converter 292a, and to the right hydraulic pump 290b via a right power converter 292b.

Figure 6:
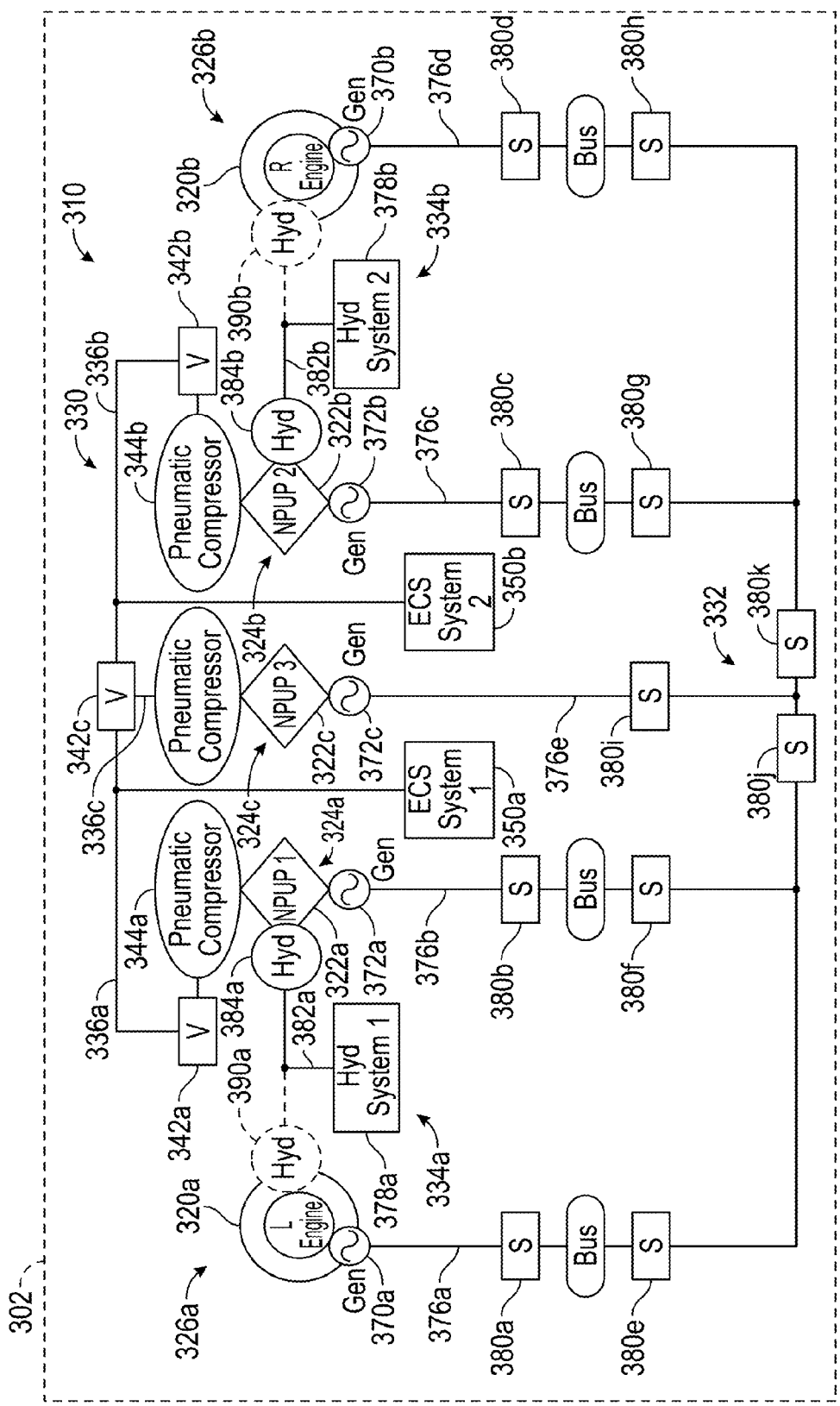
FIG. 6 is a schematic view of another embodiment of the secondary power system shown in FIG. 3, where the secondary power system includes three NPUP generation sources.

FIG. 6 illustrates another embodiment of the secondary power system 310. The aircraft 302 may include a left NPUP generation system 324a, a right NPUP generation system 324b, a central NPUP generation system 324c, a left main engine extraction system 326a, and a right main engine extraction system 326b. Similar to the embodiment as shown in FIG. 5, the secondary power system 310 may include a left aircraft main engine 320a, a right aircraft main engine 320b, three NPUP generation sources 322a, 322b, and 322c, a pneumatic system 330, an electrical system 332, and hydraulic systems 334a, 334b. The NPUP generation systems 324a-324c may provide between about eighty percent to about one hundred percent of the secondary power required by the consumption systems 12 (shown in FIGS. 1-2) located within the aircraft 302 during normal operation. In the exemplary embodiment as shown in FIG. 6, the main engines 320a, 320b may be started by an electrical starter, a hydraulic motor, a jet fuel starter, or a ground pneumatic source.

The pneumatic system 330 may include a left pneumatic distribution channel 336a, a right pneumatic distribution channel 336b, a central pneumatic distribution channel 336c, and pneumatic valves 342a-342c. Compressed air may be supplied to the pneumatic distribution channels 336a-336c by respective pneumatic compressors 344a-344c. The pneumatic compressors 344a-344c may be used to supply air to ECSs 350a, 350b. Similar to the embodiment as shown in FIG. 4, compressed air may not be bled from compressors (not shown) of the main engines 320a, 320b. Instead, the pneumatic compressors 344a, 344b may be used to provide substantially all of the compressed air required by the ECSs 350a, 350b. Since compressed air is not bled from the compressors, other devices, such as fluid based or electromechanical de-icers, heater pads or elements may be located on the left and right wings (not shown) and used for wing ice protection.

The electrical system 332 includes a left main engine generator 370a, a right main engine generator 370b, a left NPUP generator 372a, a right NPUP generator 372b, a central NPUP generator 372c, power feeders 376a-376e, and electrical switches 380a-380k. The left NPUP generation system 324a and the right NPUP generation system 324b may act as primary power sources for secondary power. The NPUP generators 372a, 372b may be rated to generally provide power to substantially all of the electrical loads on the aircraft 302, where the third NPUP generator 372c supports flight with an inoperative main engine generator 370a, 370b, or an inoperative NPUP generation source 322a, 322b. The main engine generators 370a, 370b may be sized to support essential loads. The main engine generators 370a, 370b may be implemented only after the two primary NPUP generation sources 322a, 322b or the NPUP generators 372a, 372b have become inoperative.

The left hydraulic system 378a may be connected to a left NPUP hydraulic pump 384a via a left hydraulic distribution channel 382a, and the right hydraulic system 378b may be connected to a right NPUP hydraulic pump 384b via a right hydraulic distribution channel 382b. The NPUP hydraulic pumps 384a, 384b may be rated to generally provide a substantially all of the hydraulic power required by the aircraft 302 during normal operation. Specifically, the left NPUP hydraulic pump 384a may be used to provide the hydraulic power required by the left hydraulic system 378a, and the right NPUP hydraulic pump 384b may be used to provide the hydraulic power required by the left hydraulic system 378b. In one embodiment, optional main engine hydraulic pumps 390a, 390b may be used to supplement the NPUP hydraulic pumps 384a, 384b in the event the NPUP hydraulic pumps 384a, 384b are inoperative, or during high demand conditions. The main engine hydraulic pumps 390a, 390b may be smaller in size when compared to the NPUP hydraulic pumps 384a, 384b.

FIG. 7 illustrates yet another embodiment of secondary power system 410. The aircraft 402 may include a left NPUP generation system 424a, a right NPUP generation system 424b, a central NPUP generation system 424c, a left main engine extraction system 426a, and a right main engine extraction system 426b. The secondary power system 410 may include a left aircraft main engine 420a, a right aircraft main engine 420b, three NPUP generation sources 422a, 422b, and 422c, a pneumatic system 430, an electrical system 432, and hydraulic systems 434a, 434b. In the exemplary embodiment as shown in FIG. 7, the NPUP generation systems 424a-424c may provide between about eighty percent to about one hundred percent of the secondary power required by the consumption systems 12 (FIGS. 1-2) located within the aircraft 402 during normal operation. In the exemplary embodiment as shown in FIG. 7, the main engines 420a, 420b may be pneumatically started based on the air supplied to the pneumatic system 430 from pneumatic compressors 444a, 444b.

The pneumatic system 430 may include a left pneumatic distribution channel 436a, a right pneumatic distribution channel 436b, and pneumatic valves 442a-442c. Compressed air may be supplied to the pneumatic distribution channels 436a, 436b by respective pneumatic compressors 444a, 444b. The pneumatic compressors 444a, 444b may be used to supply air to respective ECSs 450a, 450b. Bleed or compressed air 460a, 460b may be extracted from compressors (not shown) of the main engines 420a, 420b. The compressed air 460a, 460b may supplement the air provided by the pneumatic compressors 444a, 444b. However, the pneumatic compressors 444a, 444b may provide most of the air to the ECSs 450a, 450b. The compressed air 460a, 460b may be used for wing ice protection.

The electrical system 432 includes a left main engine generator 470a, a right main engine generator 470b, a left NPUP generator 472a, a right NPUP generator 472b, a central NPUP generator 472c, power feeders 476a-476e, and a plurality of electrical switches 480a-480k. The left NPUP generation system 424a and the right NPUP generation system 424b may act as primary power sources for secondary power. The centrally located NPUP generation source 422c may be smaller in size when compared to the two NPUP generation sources 422a, 422b. The NPUP generators 472a, 472b may be rated to generally provide power to substantially all of the electrical loads on the aircraft 402, where the third NPUP generator 472c may support essential loads in the event one of the NPUP generators 472a, 472b become inoperative. The main engine generators 470a, 470b may be sized to support essential loads. The main engine generators 470a, 470b may be implemented only after the two primary NPUP generation sources 422a, 422b or the NPUP generators 472a, 472b have become inoperative.

The left hydraulic system 478a may be connected to a left NPUP hydraulic pump 484a via a left hydraulic distribution channel 482a, and the right hydraulic system 478b may be connected to a right NPUP hydraulic pump 484b via a right hydraulic distribution channel 482b. In one embodiment, two optional auxiliary NPUP hydraulic pumps 490a, 490b may be provided. Both of the optional auxiliary NPUP hydraulic pumps 490a, 490b may be driven by the centrally located NPUP generation source 422c. The left auxiliary NPUP hydraulic pump 490a may be used to supplement the left NPUP hydraulic pump 484a, and the right auxiliary NPUP hydraulic pump 490b may be used to supplement the right NPUP hydraulic pump 484b. The NPUP hydraulic pumps 484a, 484b may be rated to generally provide a majority of the hydraulic power required by the aircraft 402, and the auxiliary NPUP hydraulic pumps 490a, 490b may be used to supplement the NPUP hydraulic pumps 484a, 484b. The auxiliary NPUP hydraulic pump 490a, 490b may be smaller in size when compared to the NPUP hydraulic pumps 484a, 484b.

Figure 8:
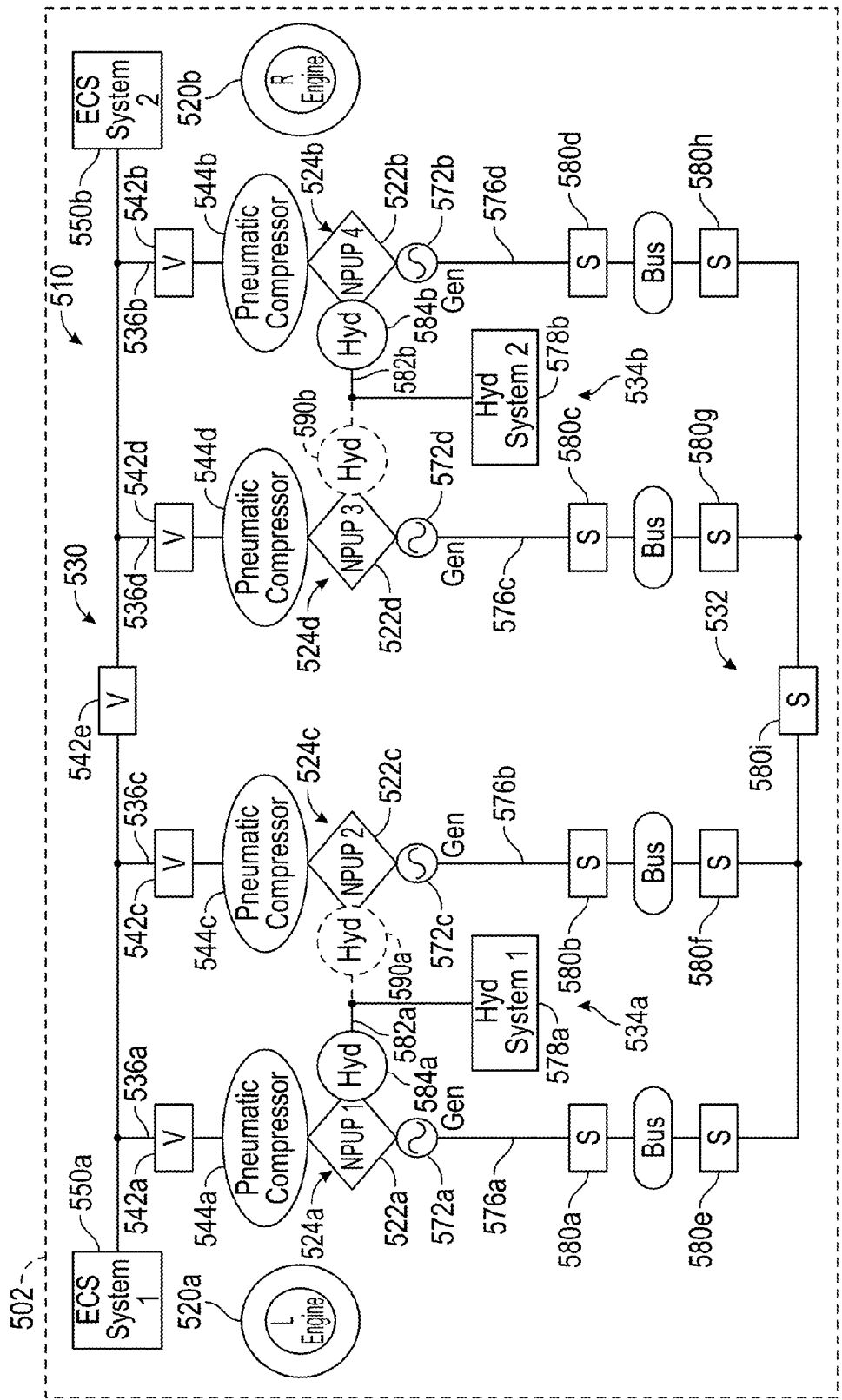
FIG. 8 is a schematic view of another embodiment of the secondary power system shown in FIG. 3, where the secondary power system includes four NPUP generation sources.

FIG. 8 illustrates another embodiment of the secondary power system 510. The aircraft 402 may include a left NPUP generation system 524a, a right NPUP generation system 524b, and two centrally located NPUP generation systems 524c, 524d. The secondary power system 510 may include four NPUP generation sources 522a-522d, a pneumatic system 530, an electrical system 532, and hydraulic systems 534a, 534b. The NPUP generation systems 522a-522d may provide substantially all of the secondary power (i.e., one hundred percent) required by the consumption systems 12 (FIGS. 1-2) located within the aircraft 502 during normal operation. Thus, aircraft main engines 520a, 520b may not be part of the secondary power system 510. In the exemplary embodiment as shown in FIG. 8, the main engines 520a, 520b may be started by a jet fuel starter or a ground pneumatic source.

The pneumatic system 530 may include a left pneumatic distribution channel 536a, a right pneumatic distribution channel 536b, two central pneumatic distribution channels 536c-536d, and pneumatic valves 542a-542e. Compressed air may be supplied to the pneumatic distribution channels 536a-536d by respective pneumatic compressors 544a-544d. The pneumatic compressors 544a-544d may be used to supply air to ECSs 550a, 550b. Bleed or compressed air may not be extracted from compressors (not shown) of the main engines 520a, 520b. Instead, the pneumatic compressors 544a-544d may be used to provide substantially all of the compressed air required by the ECSs 550a, 550b. Since compressed air is not bled from the compressors, other devices, such as fluid based or electromechanical de-icers, heater pads or elements may be located on the left and right wings (not shown) and used for wing ice protection.

The electrical system 532 may include a left NPUP generator 572a, a right NPUP generator 572b, two central NPUP generators 572c-572d, power feeders 576a-576d, and a plurality of electrical switches 580a-580i. The NPUP generators 572a-572d may be rated to provide substantially all of the power required by electrical loads on the aircraft 502.

The left hydraulic system 578a may be connected to a left NPUP hydraulic pump 584a via a left hydraulic distribution channel 582a, and the right hydraulic system 578b may be connected to a right NPUP hydraulic pump 584b via a right hydraulic distribution channel 582b. In one embodiment, two optional auxiliary NPUP hydraulic pumps 590a, 590b may be provided as well. Specifically, the left auxiliary NPUP hydraulic pump 590a may be driven by the left central NPUP generation source 522c, and the right auxiliary NPUP hydraulic pump 590b may be driven by the right central NPUP generation source 522d. In one embodiment, the NPUP hydraulic pumps 584a, 584b may be rated to generally provide substantially all of the hydraulic power required by the aircraft 502, where the auxiliary NPUP hydraulic pumps 590a, 590b may be smaller in size when compared to the NPUP hydraulic pumps 584a, 584b. The auxiliary NPUP hydraulic pumps 590a, 590b may be used to supplement the NPUP hydraulic pumps 584a, 584b. In another embodiment, the auxiliary NPUP hydraulic pumps 590a, 590b may be equal in size when compared to the NPUP hydraulic pumps 584a, 584b.

Figure 9:
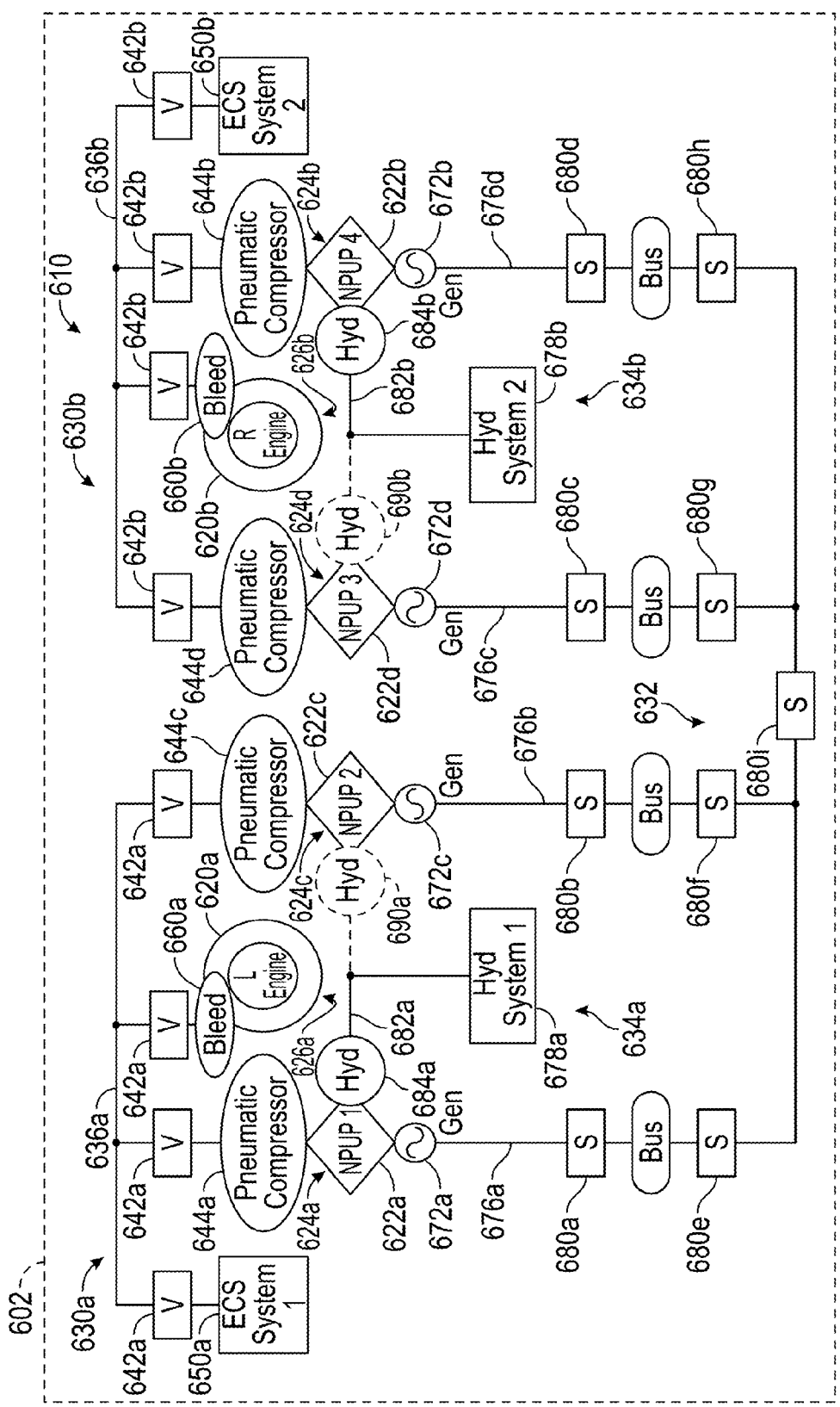
FIG. 9 is a schematic view of yet another embodiment of the secondary power system shown in FIG. 3, where the secondary power system includes four NPUP generation sources.

FIG. 9 illustrates yet another embodiment of the secondary power 610. The aircraft 602 may include a left NPUP generation system 624a, a right NPUP generation system 624b, two centrally located NPUP generation systems 624c, 624d, a left main engine extraction system 626a, and a right main engine extraction system 626b. The secondary power system 610 may include a left aircraft main engine 620a, a right aircraft main engine 620b, four NPUP generation sources 622a-622d, pneumatic systems 630a, 630b, an electrical system 632, and hydraulic systems 634a, 634b. The NPUP generation sources 622a-622d may provide between about eighty-five percent to about ninety-five percent of the secondary power required by the consumption systems 12 (FIGS. 1-2) located within the aircraft 602 during normal operation. In the exemplary embodiment as shown in FIG. 9, the main engines 620a, 620b may be pneumatically started based on the air supplied to the pneumatic system 630 from pneumatic compressors 644a-644d.

The left pneumatic system 630a may include a left pneumatic distribution channel 636a and pneumatic valves 642a, and the right pneumatic system 630b may include a right pneumatic distribution channel 636 and pneumatic valves 642b. Compressed air may be supplied to the left pneumatic distribution channels 636a by pneumatic compressors 644a and 644c, and compressed air may be supplied to the left pneumatic distribution channels 636a by pneumatic compressors 644b and 644d. Unlike the embodiment as shown in FIG. 8, compressed air 660a, 660b may be extracted from compressors (not shown) of the main engines 620a, 620b. The compressed air 660a, 660b may be used for wing ice protection. However, the pneumatic compressors 644a-644d may be used to provide substantially all of the air required by the ECSs 650a, 650b. Specifically, the pneumatic compressors 644a and 644c provide compressed air to the ECS 650a, and the pneumatic compressors 644b and 644d provide compressed air to the ECS 650b.

The electrical system 632 may include a left NPUP generator 672a, a right NPUP generator 672b, two central NPUP generators 672c-672d, power feeders 676a-676d, and a plurality electrical switches 680a-680i. The NPUP generators 672a-672d may be rated to generally provide power to substantially all of the electrical loads on the aircraft 602.

The left hydraulic system 678a may be connected to a left NPUP hydraulic pump 684a via a left hydraulic distribution channel 682a, and the right hydraulic system 678b may be connected to a right NPUP hydraulic pump 684b via a right hydraulic distribution channel 682b. In one embodiment, two optional auxiliary NPUP hydraulic pumps 690a, 690b may be provided as well. Specifically, the left auxiliary NPUP hydraulic pump 690a may be driven by the left central NPUP generation source 622c, and the right auxiliary NPUP hydraulic pump 690b may be driven by the right central NPUP generation source 622d. In one embodiment, the NPUP hydraulic pumps 684a, 684b may be rated to generally provide substantially all of the hydraulic power required by the aircraft 602, and the auxiliary NPUP hydraulic pumps 690a, 690b may be smaller in size when compared to the NPUP hydraulic pumps 684a, 684b. The auxiliary NPUP hydraulic pumps 690a, 690b may be used to supplement the NPUP hydraulic pumps 684a, 684b. In another embodiment, the auxiliary NPUP hydraulic pumps 690a, 690b may be equal in size when compared to the NPUP hydraulic pumps 684a, 684b.

Figure 10:
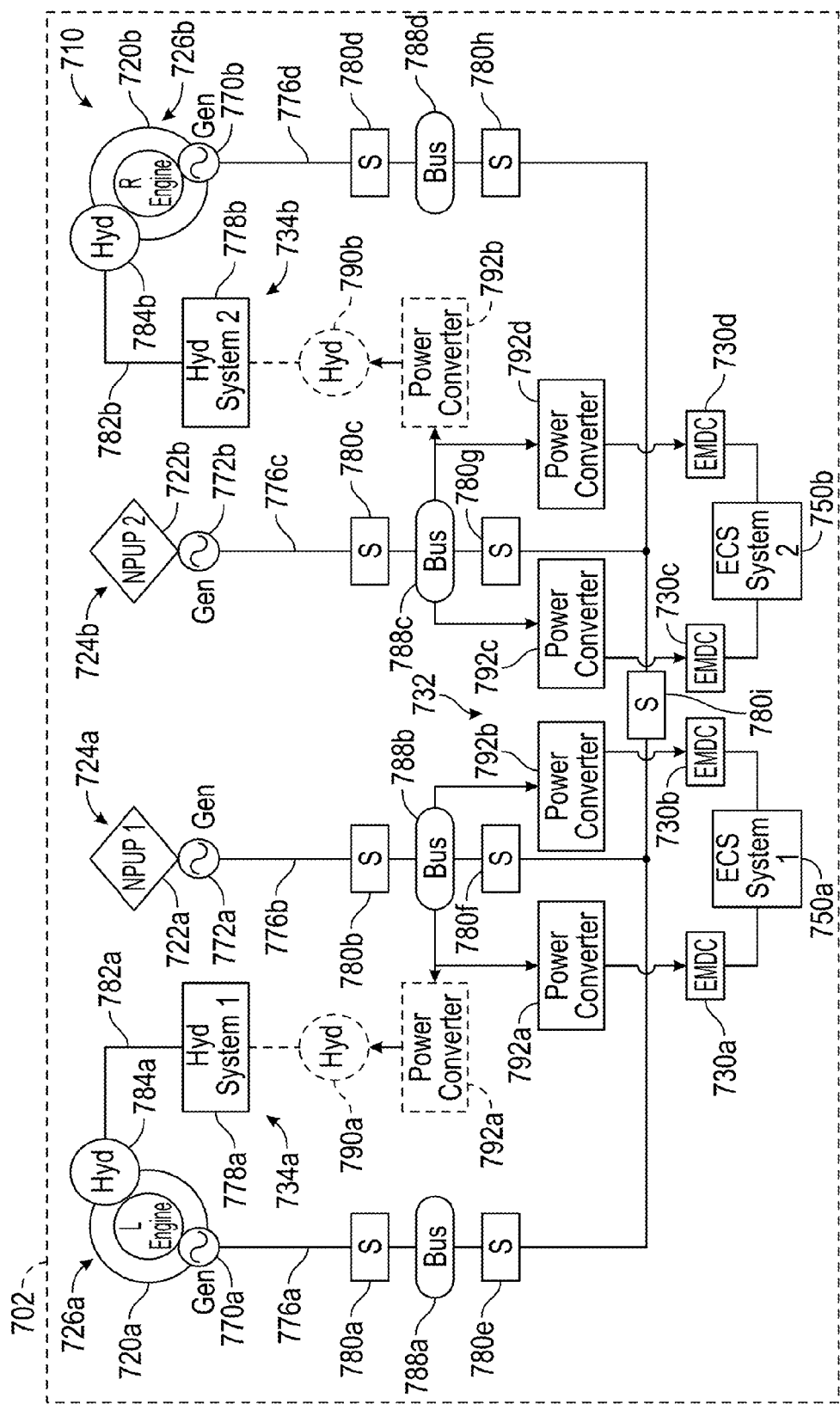
FIG. 10 is a schematic view of another embodiment of the secondary power system shown in FIG. 3, which may include two NPUP generation sources, an electrical system, and a hydraulic system.

FIG. 10 illustrates yet another embodiment of the secondary power system 710. The aircraft 702 may include a left NPUP generation system 724a, a right NPUP generation system 724b, a left main engine extraction system 726a, and a right main engine extraction system 726b. The secondary power system 710 may include a left aircraft main engine 720a, a right aircraft main engine 720b, NPUP generation sources 722a, 722b, an electrical system 732, and hydraulic systems 734a, 734b. The NPUP generation systems 724a, 724b may provide between about sixty percent to about eighty percent of the secondary power required by the consumption systems 12 (FIGS. 1-2) located within the aircraft 702 during normal operation.

It should be noted that unlike the embodiments as shown in FIGS. 3-9, the secondary power system 710 may not include a pneumatic system, and may not bleed air from the compressors (not shown) of the main engines 720a, 720b. Moreover, the secondary power system 710 may not rely on the NPUP generation systems 724a, 724b to provide pneumatic air. Instead, electric motor driven compressors (EMDCs) 730a-730d may be used to provide substantially all of the compressed air required by the ECSs 750a, 750b. Since compressed air is not bled from compressors of the main engines 720a, 720b, other devices, such as fluid based or electromechanical de-icers, heater pads or elements may be located on the left and right wings (not shown) and used for wing ice protection.

The electrical system 732 includes a left main engine generator 770a, a right main engine generator 770b, a left NPUP generator 772a, a right NPUP generator 772b, power feeders 776a-776d, a plurality of electrical switches 780a-480i, electrical busses 788a-788d, and power converters 792a-792d. The NPUP generators 772a, 772b may supply the electrical power to the EMDCs 792a-792d via electrical busses 788b and 788c and power converters 792a-792d. The main engine generators 770a, 770b may be sized to support starting of the main engines 720a, 720b. Additionally, the main engine generators 770a, 770b may be sized to support essential loads. The actual loading of the main engine generators 770a, 770b may be managed to minimize the amount of power extracted from the main engines 720a, 720b. That is, the main engine generators 770a, 770b may be used to either start the main engines 720a, 720b or function as electric generators during flight.

The left hydraulic system 778a may be connected to a left main engine hydraulic pump 784a via a left hydraulic distribution channel 782a and, and the right hydraulic system 778b may be connected to a right main engine hydraulic pump 784b via a right hydraulic distribution channel 782b. The main engine hydraulic pumps 784a, 784b may be rated to generally provide all of hydraulic power required by the aircraft 702. Specifically, the left main engine hydraulic pump 784a may be used to provide the hydraulic power required by the left hydraulic system 734a, and the right main engine hydraulic pump 784b may be used to provide the hydraulic power required by the left hydraulic system 734b. In one embodiment, auxiliary electric hydraulic pumps 790a, 790b may be used to supplement the main engine hydraulic pumps 784a, 784b in the event the main engine hydraulic pumps 784a 784b are inoperative, or during high demand conditions. The NPUP generators 772a, 772b may be used to provide electrical power to the electric hydraulic pumps 790a, 790b. Specifically, electrical power from one of the NPUP generators 772, 772b may be provided to the left electric hydraulic pump 790a via a power converter 792a and to the right hydraulic pump 790b via a right power converter 792b.

Figure 11:
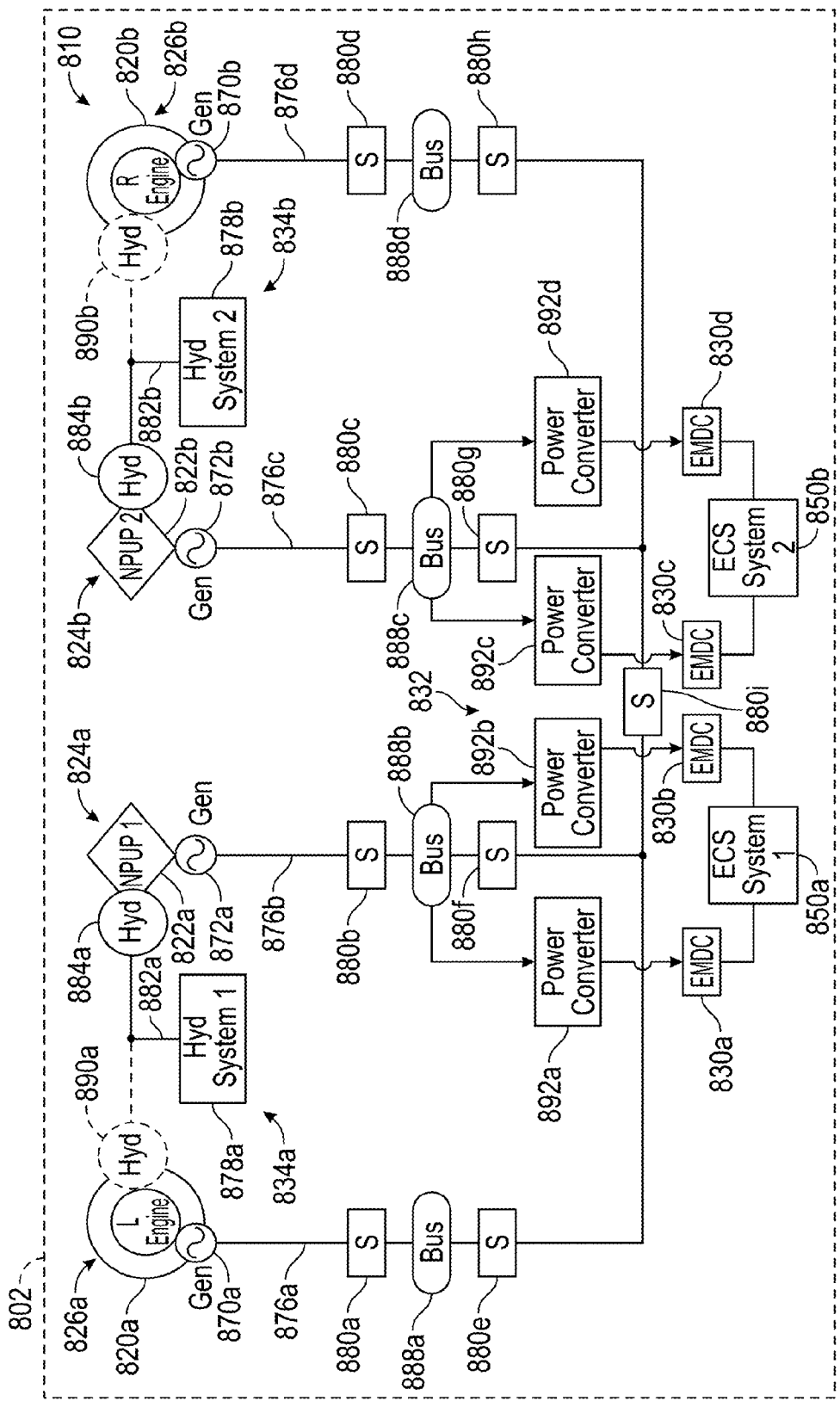
FIG. 11 is a schematic view of yet another embodiment of the secondary power system shown in FIG. 3, which may include two NPUP generation sources, an electrical system, and a hydraulic system.

FIG. 11 illustrates another embodiment of the secondary power system 810. The aircraft 802 may include a left NPUP generation system 824a, a right NPUP generation system 824b, a left main engine extraction system 826a, and a right main engine extraction system 826b. The secondary power system 810 may include a left aircraft main engine 820a, a right aircraft main engine 820b, two NPUP generation sources 822a, 822b, an electrical system 832, and hydraulic systems 834a, 834b. The NPUP generation systems 824a, 824b may provide between about seventy percent to about ninety percent of the secondary power required by the consumption systems 12 (FIGS. 1-2) located within the aircraft 802 during normal operation. Similar to the embodiment as shown in FIG. 10, the secondary power system 810 may not include a pneumatic system, and includes EMDCs 830a-830d to provide substantially all of the compressed air required by the ECSs 850a, 850b. Since compressed air is not bled from compressors of the main engines 820a, 820b, other devices, such as fluid based or electromechanical de-icers, heater pads or elements may be located on the left and right wings (not shown) and used for wing ice protection.

The electrical system 832 includes a left main engine generator 870a, a right main engine generator 870b, a left NPUP generator 872a, a right NPUP generator 872b, power feeders 876a-876d, a plurality of electrical switches 880a-880i, electrical busses 888a-888d, and power converters 892a-892d. The NPUP generators 872a, 872b may supply electrical power to the EMDCs 892a-892d via electrical busses 888b and 888c and power converters 892a-892d. The main engine generators 870a, 870b may be sized to support starting of the main engines 820a, 820b. Additionally, the main engine generators 870a, 870b may be sized to support essential loads. The actual loading of the main engine generators 870a, 870b may be managed to minimize the amount of power extracted from the main engines 820a, 820b.

The left hydraulic system 878a may be connected to a left NPUP hydraulic pump 884a via a left hydraulic distribution channel 882a, and the right hydraulic system 878b may be connected to a right NPUP hydraulic pump 884b via a right hydraulic distribution channel 882b. The NPUP hydraulic pumps 884a, 884b may be rated to generally provide substantially all or a majority of the hydraulic power required by the aircraft 802. Specifically, the left NPUP hydraulic pump 884a may be used to provide the hydraulic power required by the left hydraulic system 878a, and the right NPUP hydraulic pump 884b may be used to provide the hydraulic power required by the left hydraulic system 878b. In one embodiment, optional main engine hydraulic pumps 890a, 890b may be used to supplement the NPUP hydraulic pumps 384a, 384b or provide relief in the event one of the NPUP hydraulic pumps 384a, 384b are inoperative. The main engine hydraulic pumps 890a, 890b may be smaller in size when compared to the NPUP hydraulic pumps 884a, 884b.

Figure 12:
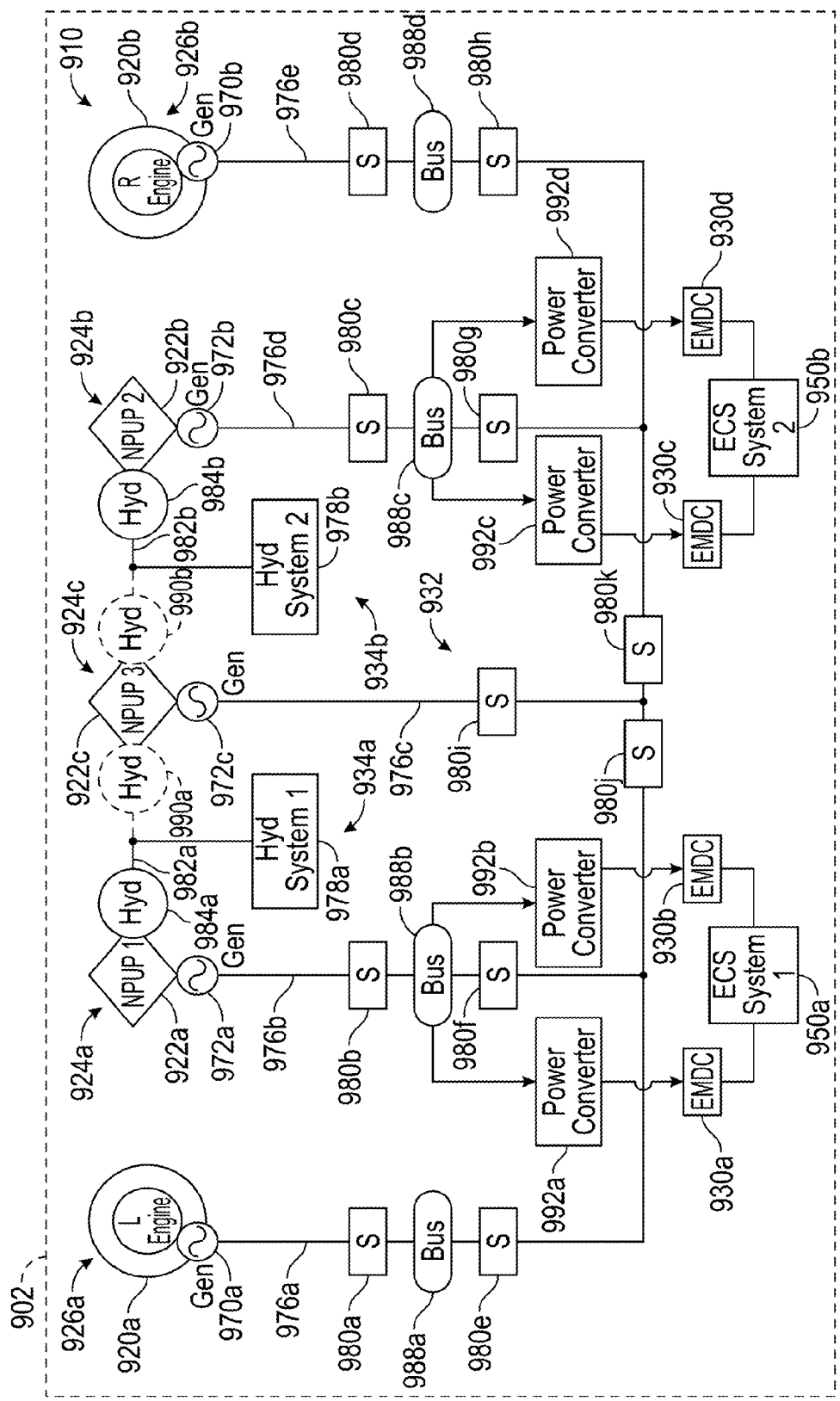
FIG. 12 is a schematic view of another embodiment of the secondary power system shown in FIG. 3, which may include two NPUP generation sources, an electrical system, and a hydraulic system.

FIG. 12 illustrates yet another embodiment of the secondary power system 910 that may be used to provide secondary power in an aircraft 902. The aircraft 902 may include a left NPUP generation system 924a, a right NPUP generation system 924b, a central NPUP generation system 924c, a left main engine extraction system 926a, and a right main engine extraction system 926b. The secondary power system 910 may include a left aircraft main engine 920a, a right aircraft main engine 920b, three NPUP generation sources 922a-922c, an electrical system 932, and hydraulic systems 934a, 934b. The NPUP generation systems 924a, 924b may provide between about ninety-five percent to about one hundred percent of the secondary power required by the consumption systems (FIGS. 1-2) located within the aircraft 902 during normal operation. The secondary power system 910 may not include a pneumatic system, and instead includes EMDCs 930a-930d to provide substantially all of the compressed air required by the ECSs 950a, 950b. Since compressed air is not bled from compressors of the main engines 920a, 920b, other devices, such as fluid based or electromechanical de-icers, heater pads or elements may be located on the left and right wings (not shown) and used for wing ice protection. In the exemplary embodiment as shown in FIG. 12, the main engines 920a, 920b may be started by a jet fuel starter or a ground pneumatic source.

The electrical system 932 includes a left main engine generator 970a, a right main engine generator 970b, a left NPUP generator 972a, a right NPUP generator 972b, a central NPUP generator 972c, power feeders 976a-976e, a plurality of electrical switches 980a-980k, electrical busses 988a-988d, and power converters 992a-992d. The left NPUP generation source 922a and the right NPUP generation source 922b may act as primary power sources for secondary power. The centrally located NPUP generation source 922c may be smaller in size when compared to the two NPUP generation source 922a, 922b. The NPUP generators 972a, 972b may be rated to support substantially all of the electrical loads on the aircraft 902, where the third NPUP generator 972c may support essential loads. The main engine generators 970a, 970b may be sized to support essential loads as well.

The left hydraulic system 978a may be connected to a left NPUP hydraulic pump 984a via a left hydraulic distribution channel 982a, and the right hydraulic system 978b may be connected to a right NPUP hydraulic pump 984b via a right hydraulic distribution channel 982b. In one embodiment, two optional auxiliary NPUP hydraulic pumps 990a, 990b may be provided. Both of the optional auxiliary NPUP hydraulic pumps 990a, 990b may be driven by the centrally located NPUP generation source 922c. The left auxiliary NPUP hydraulic pump 990a may be used to supplement the left NPUP hydraulic pump 984a, and the right auxiliary NPUP hydraulic pump 990b may be used to supplement the right NPUP hydraulic pump 984b. The NPUP hydraulic pumps 984a, 984b may be rated to provide substantially all of the mechanical hydraulic power required by the aircraft 902, and the auxiliary NPUP hydraulic pumps 990a, 990b may be used provide relief in the event one of the NPUP hydraulic pumps 984a, 984b are inoperative, and used during times of high demand. The auxiliary NPUP hydraulic pump 990a, 990b may be smaller in size when compared to the NPUP hydraulic pumps 984a, 984b.

Figure 13:
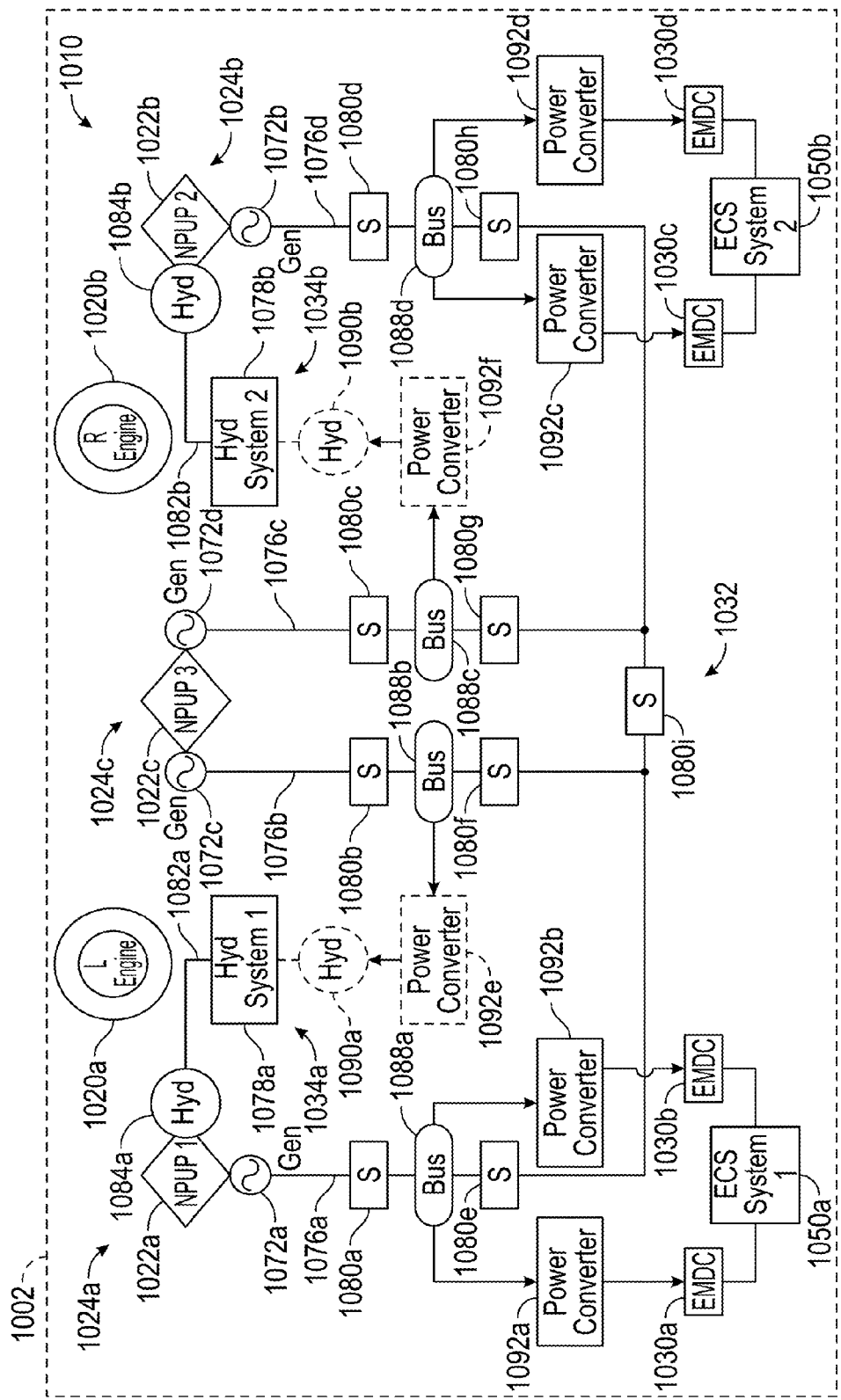
FIG. 13 is a schematic view of yet another embodiment of the secondary power system shown in FIG. 3, which may include three NPUP generation sources, an electrical system, and a hydraulic system.

FIG. 13 illustrates another embodiment of the secondary power system 1010. The aircraft 1002 may include a left NPUP generation system 1024a, a right NPUP generation system 1024b, and a central NPUP generation systems 1024c. The secondary power system 1010 may include three NPUP generation sources 1022a-1022c, an electrical system 1032, and hydraulic systems 1034a, 1034b. The NPUP generation systems 1024a-1024c may provide substantially all of the secondary power required by the consumption systems 12 (FIGS. 1-2) located within the aircraft 1002 during normal operation. Thus, the a aircraft main engines 1020a, 1020b may not be part of the secondary power generation system 1010. Moreover, the secondary power system 1010 may not include a pneumatic system, and instead includes EMDCs 1030a-1030d to provide substantially all of the compressed air required by ECSs 1050a, 1050b. Since compressed air is not bled from compressors of the main engines 1020a, 1020b, other devices, such as fluid based or electromechanical de-icers, heater pads or elements may be located on the left and right wings (not shown) and used for wing ice protection. In the exemplary embodiment as shown in FIG. 13, the main engines 1020a, 1020b may be started by a jet fuel starter or a ground pneumatic source.

The electrical system 1032 may include a left NPUP generator 1072a, a right NPUP generator 1072b, central NPUP generators 1072c-1072d, power feeders 1076a-1076d, a plurality of electrical switches 1080a-1080i, electrical busses 1088a-1088d, and power converters 1092a-1092f (power converters 1092e and 1092f may be optional, and are discussed below). The central NPUP generation source 1022c may be coupled to both NPUP generators 1072c and 1072d. The NPUP generators 1072a-1072d may be rated to support all of the electrical loads on the aircraft 1002.

The left hydraulic system 1078a may be connected to a left NPUP hydraulic pump 1084a via a left hydraulic distribution channel 1082a, and the right hydraulic system 1078b may be connected to a right NPUP hydraulic pump 1084*b* via a right hydraulic distribution channel 1082*b*. In one embodiment, two optional electrically powered auxiliary NPUP hydraulic pumps 1090*a*, 1090*b* may be provided. The left auxiliary NPUP hydraulic pump 1090*a* may be provided electrical energy by one of the NPUP generators 1072*a*-1072*c* via the electrical bus 1088*b* and the optional power converter 1092*e*, and the right auxiliary NPUP hydraulic pump 1090*b* may be provided electrical energy by one of the NPUP generators 1072*a*-1072*c* via the electrical bus 1088*c* and the optional power converter 1092*f*. The left auxiliary NPUP hydraulic pump 1090*a* may be used to supplement the left NPUP hydraulic pump 1084*a*, and the right auxiliary NPUP hydraulic pump 1090*b* may be used to supplement the right NPUP hydraulic pump 1084*b*. The NPUP hydraulic pumps 1084*a*, 1084*b* may be rated to provide substantially all of the mechanical hydraulic power required by the aircraft 1002, and the auxiliary NPUP hydraulic pumps 1090*a*, 1090*b* may be used provide relief in the event the NPUP hydraulic pumps 1084*a*, 1084*b* are inoperative and during times of high demand.

Figure 14:
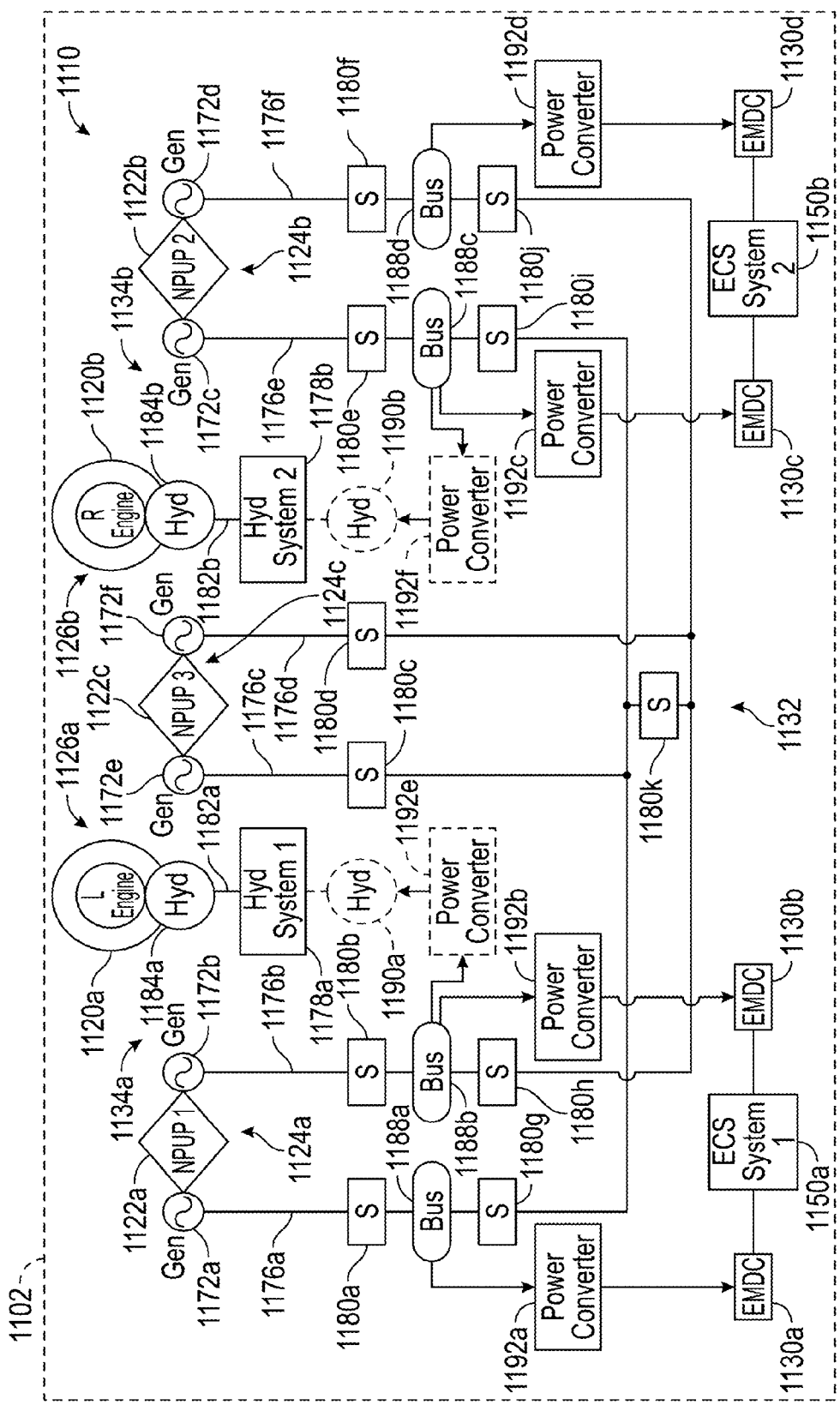
FIG. 14 is a schematic view of another embodiment of the secondary power system shown in FIG. 3, which may include three NPUP generation sources, an electrical system, and a hydraulic system.

FIG. 14 illustrates yet another embodiment of the secondary power system 1110. The aircraft 1102 may include a left NPUP generation system 1124*a*, a right NPUP generation system 1124*b*, a central NPUP generation system 1124*c*, a left main engine extraction system 1126*a*, and a right main engine extraction system 1126*b*. The secondary power system 1110 may include a left aircraft main engine 1120*a*, a right aircraft main engine 1120*b*, three NPUP generation sources 1122*a*-1122*c*, an electrical system 1132, and hydraulic systems 1134*a*, 1134*b*. The NPUP generation systems 1122*a*-1122*c* may provide between about eighty-five percent to about ninety-five percent of the secondary power required by the consumption systems 12 (FIGS. 1-2) located within the aircraft 1102 during normal operation. The secondary power system 1110 may not include a pneumatic system, and instead includes EMDCs 1130*a*-1130*d* to provide substantially all of the compressed air required by ECSs 1150*a*, 1050*b*. Since compressed air is not bled from compressors of the main engines 1120*a*, 1120*b*, other devices, such as fluid based or electromechanical de-icers, heater pads or elements may be located on the left and right wings (not shown) and used for wing ice protection. In the exemplary embodiment as shown in FIG. 14, the main engines 1120*a*, 1120*b* may be started by a hydraulic motor, a jet fuel starter, or a ground pneumatic source.

The electrical system 1132 includes left NPUP generators 1172*a*, 1172*b*, right NPUP generators 1172*c*, 1172*d*, central NPUP generators 1172*e*-1172*f*, power feeders 1176*a*-1176*f*, a plurality of electrical switches 1180*a*-1180*j*, electrical busses 1188*a*-1188*d*, and power converters 1192*a*-1192*f* (the power converters 1192*e* and 1192*f* are optional, and are discussed below). The central NPUP generation source 1122*c* may be coupled to both NPUP generators 1172*e* and 1172*f*. The NPUP generators 1172*a*-1172*d* may be rated to support all of the electrical loads on the aircraft 1102.

The left hydraulic system 1178*a* may be connected to a left main engine hydraulic pump 1184*a* via a left hydraulic distribution channel 1182*a*, and the right hydraulic system 1178*b* may be connected to a right main engine hydraulic pump 1184*b* via a right hydraulic distribution channel 1182*b*. In one embodiment, two electrically driven optional auxiliary NPUP hydraulic pumps 1190*a*, 1190*b* may be provided. The left auxiliary NPUP hydraulic pump 1190*a* may be provided electrical energy by one of the NPUP generators 1172*a*-1172*c* via the electrical bus 1188*b* and the optional power converter 1192*e*, and the right auxiliary NPUP hydraulic pump 1190*b* may be provided electrical energy by one of the NPUP generators 1172*a*-1172*c* via the electrical bus 1188*c* and the optional power converter 1192*f*. The left auxiliary NPUP hydraulic pump 1190*a* may be used to supplement the left NPUP hydraulic pump 1184*a*, and the right auxiliary NPUP hydraulic pump 1190*b* may be used to supplement the right NPUP hydraulic pump 1184*b*. The main engine hydraulic pumps 1184*a*, 1184*b* may be rated to provide substantially all of the mechanical hydraulic power required by the aircraft 1118, and the auxiliary NPUP hydraulic pumps 1190*a*, 1190*b* may be used provide relief in the event the main engine hydraulic pumps 1184*a*, 1184*b* are inoperative and during times of high demand.

Figure 15:
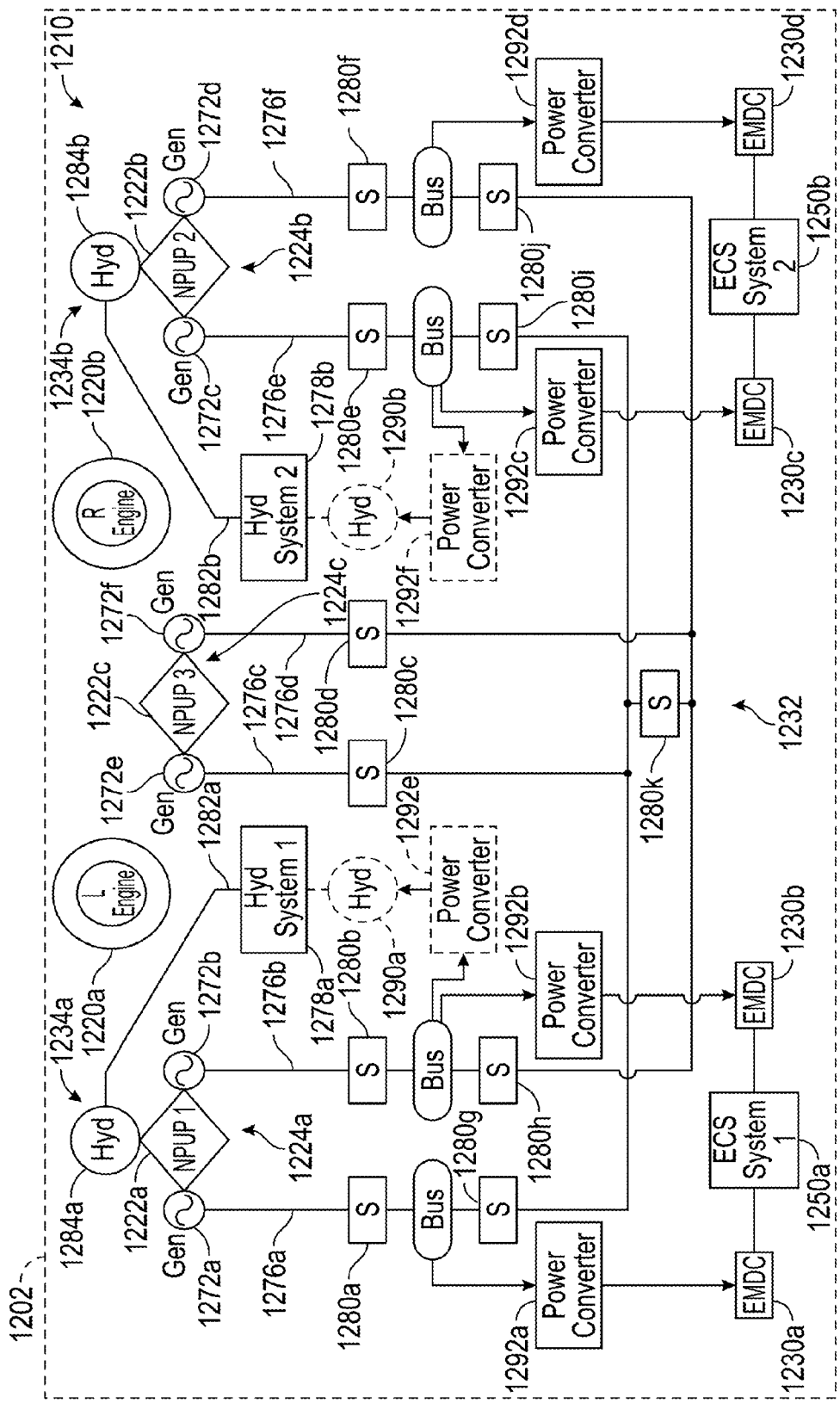
FIG. 15 is a schematic view of yet another embodiment of the secondary power system shown in FIG. 3, which may include three NPUP generation sources, an electrical system, and a hydraulic system.

FIG. 15 illustrates another embodiment of the secondary power system 1210. The aircraft 1202 may include a left NPUP generation system 1224*a*, a right NPUP generation system 1224*b*, and a central NPUP generation system 1224*c*. The secondary power system 1210 may include three NPUP generation sources 1222*a*-1222*c*, an electrical system 1232, and hydraulic systems 1234*a*, 1234*b*. The NPUP generation systems 1224*a*-1224*c* may provide substantially all of the secondary power required by the consumption systems 12 (FIGS. 1-2) located within the aircraft 1202 during normal operation. Thus, the secondary power system 1210 may not include aircraft main engines 1220*a*, 1220*b*. Moreover, the secondary power system 1210 may not include a pneumatic system, and instead includes EMDCs 1230*a*-1230*d* to provide substantially all of the compressed air required by ECSs 1250*a*, 1250*b*. Since compressed air is not bled from compressors of the main engines 1220*a*, 1220*b*, other devices, such as fluid based or electromechanical de-icers, heater pads or elements may be located on the left and right wings (not shown) and used for wing ice protection. In the exemplary embodiment as shown in FIG. 15, the main engines 1220*a*, 1220*b* may be started by a jet fuel starter, or a ground pneumatic source.

The electrical system 1232 includes left NPUP generators 1272*a*, 1272*b*, right NPUP generators 1172*c*, 1172*d*, central NPUP generators 1172*e*-1172*f*, electrical power feeders 1176*a*-1176*f*, a plurality of electrical switches 1280*a*-1280*k*, electrical busses 1288*a*-1288*d*, and power converters 1292*a*-1292*f* (the power converters 1292*e* and 1292*f* may be optional, and are discussed below). The central NPUP generation source 1122*c* may be coupled to both NPUP generators 1172*e* and 1172*f*. The NPUP generators 1272*a*-1272*d* may supply substantially all of the electrical power required by the EMDCs 1292*a*-1292*d*, as well as substantially all of the electrical loads on the aircraft 1202.

The left hydraulic system 1278*a* may be connected to a left main engine hydraulic pump 1284*a* via a left hydraulic distribution channel 1282*a*, and the right hydraulic system 1278*b* may be connected to a right main engine hydraulic pump 1284*b* via a right hydraulic distribution channel 1282*b*. In one embodiment, two optional electrically driven auxiliary NPUP hydraulic pumps 1290*a*, 1290*b* may be provided. The left auxiliary NPUP hydraulic pump 1290*a* may be provided electrical energy by one of the NPUP generators 1272*a*-1272*c* via the electrical bus 1288*b* and the optional power converter 1292*e*, and the right auxiliary NPUP hydraulic pump 1290*b* may be provided electrical energy by one of the NPUP generators 1272*a*-1272*c* via the electrical bus 1288*c* and the optional power converter 1292*f*. The left auxiliary NPUP hydraulic pump 1290*a* may be used to supplement the left NPUP hydraulic pump 1284*a*, and the right auxiliary NPUP hydraulic pump 1290*b* may be used to supplement the right NPUP hydraulic pump 1284*b*. The main engine hydraulic pumps 1184*a*, 1184*b* may be rated to provide substantially all of the mechanical hydraulic power required by the aircraft 1202, and the auxiliary NPUP hydraulic pumps 1290a, 1290b may be used provide relief in the event the main engine hydraulic pumps 1184a, 1184b are inoperative, and during times of high demand.

Figure 16:
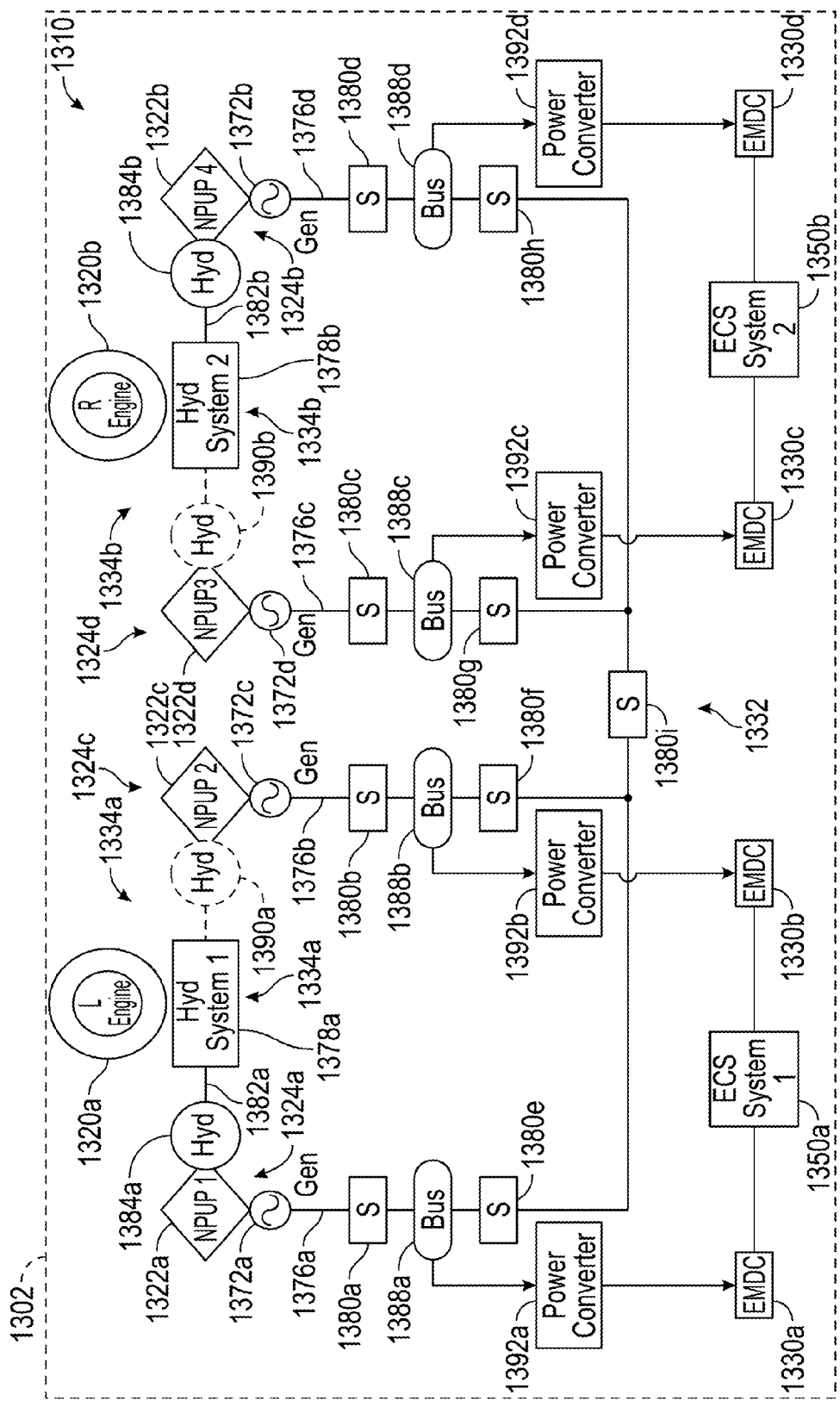
FIG. 16 is a schematic view of another embodiment of the secondary power system shown in FIG. 3, which may include four NPUP generation sources, an electrical system, and a hydraulic system.

FIG. 16 illustrates yet another embodiment of the secondary power system 1310. The aircraft 1302 may include a left NPUP generation system 1324a, a right NPUP generation system 1324b, and two centrally located NPUP generation systems 1324c, 1324d. The secondary power system 1310 may include four NPUP generation sources 1322a-1322d, an electrical system 1332, and hydraulic systems 1334a, 1334b. The NPUP generation systems 1324a-1324d may provide substantially all of the secondary power required by the consumption systems 12 (FIGS. 1-2) located within the aircraft 1302 during normal operation. Thus, the secondary power system 1310 may not include aircraft main engines 1320a, 1320b. Moreover, the secondary power system 1310 may not include a pneumatic system, and instead includes EMDCs 1330a-1330d to provide substantially all of the compressed air required by ECSs 1350a, 1350b. Since compressed air is not bled from compressors of the main engines 1320a, 1320b, other devices, such as fluid based or electromechanical de-icers, heater pads or elements may be located on the left and right wings (not shown) and used for wing ice protection. In the exemplary embodiment as shown in FIG. 16, the main engines 1320a, 1320b may be started by a jet fuel starter or a ground pneumatic source.

The electrical system 1332 may include a left NPUP generator 1372a, a right NPUP generator 1372b, two central NPUP generators 1372c, 1372d, power feeders 1376a-1376d, a plurality of electrical switches 1380a-1380i, electrical busses 1388a-1388d, and power converters 1392a-1392d. The NPUP generators 1372a-1372d may supply substantially all of the electrical power required by the EMDCs 1392a-1392d, as well as substantially all of the electrical loads on the aircraft 1302.

The left hydraulic system 1378a may be connected to a left main engine hydraulic pump 1384a via a left hydraulic distribution channel 1382a, and the right hydraulic system 1378b may be connected to a right NPUP main engine pump 1384b via a right hydraulic distribution channel 1382b. In one embodiment, two optional auxiliary NPUP hydraulic pumps 1390a, 1390b may be provided. In one embodiment, two optional auxiliary NPUP hydraulic pumps 1390a, 1390b may be provided as well. Specifically, the left auxiliary NPUP hydraulic pump 1390a may be driven by the left central NPUP generation source 1322c, and the right auxiliary NPUP hydraulic pump 1390b may be driven by the right central NPUP generation source 1322d. In one embodiment, the NPUP hydraulic pumps 1384a, 1384b may be rated to generally provide substantially all of the hydraulic power required by the aircraft 1302, and the auxiliary NPUP hydraulic pumps 1390a, 1390b may be smaller in size when compared to the NPUP hydraulic pumps 1384a, 1384b. The auxiliary NPUP hydraulic pumps 1390a, 1390b may be used to supplement the NPUP hydraulic pumps 1384a, 1384b. In another embodiment, the auxiliary NPUP hydraulic pumps 1390a, 1390b may be equal in size when compared to the NPUP hydraulic pumps 1384a, 1384b.

The disclosed secondary power systems as described and shown in FIGS. 1-16 provide a full-time source of secondary power to at least one of the power systems located within the aircraft, unlike some types of auxiliary power units (APUs) that are currently available. Specifically, some types of APUs currently available may only be used as a back-up or emergency source of secondary power. Instead, secondary power may be extracted from the aircraft's main engines, which reduces the engine total efficiency and thereby increases the specific fuel consumption of the main engines. In contrast, the embodiments as shown in FIGS. 3-7, 9-12, and 14 disclose multiple NPUP generation systems that provide a portion of the non-propulsive power required by the aircraft, which may result in a reduced amount of energy extracted from the aircraft main engine. Moreover, the embodiments as shown in FIGS. 8, 13, and 15-16 disclose multiple NPUP generation systems that provide substantially all of the secondary or non-propulsive power required by the aircraft, thus generally eliminating the need to extract energy from the main engines. Reducing or eliminating energy extracted from the main engines may result in higher main engine efficiency that results in a lower specific fuel consumption (SFC), which in turn reduces main engine emissions.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. An aircraft, comprising:
    a plurality of electrical power systems requiring electrical power;
    at least one hydraulic power system requiring hydraulic power;
    at least two main engines;
    a plurality of main engine generators each coupled to one of the at least two main engines, wherein the main engine generators are redundant electrical power sources and
    at least two non-propulsive utility power (NPUP) generation systems that are each configured to provide full-time secondary power during operation of the aircraft without being supplemented by the main engine generators, wherein the at least two NPUP generation systems are rated to support all of the electrical power required by the plurality of electrical power systems of the aircraft during operation of the aircraft.

2. The aircraft of claim 1, wherein the at least two NPUP generation systems provide at least a portion of the hydraulic power required by the at least one hydraulic power system.

3. The aircraft of claim 1, wherein the at least two NPUP generation systems provide substantially all of the primary hydraulic power required by the at least one hydraulic power system.

4. The aircraft of claim 1, further comprising at least two NPUP generation sources, wherein the at least two NPUP generation systems each include one of the at least two NPUP generation sources.

5. The aircraft of claim 4, further comprising at least two NPUP generators each coupled to one of the at least two NPUP generation sources.

6. The aircraft of claim 4, further comprising a third NPUP generation source, wherein at least three NPUP generators are each coupled to one of the at least two NPUP generation sources.

7. The aircraft of claim 4, further comprising a plurality of main engine hydraulic pumps that are each coupled to one of the at least two main engines.

8. The aircraft of claim 7, further comprising a plurality of electrically driven auxiliary NPUP hydraulic pumps and a plurality of NPUP generators each coupled to one of the at least two NPUP generation sources, wherein the NPUP generators provide electrical power to the electrically driven auxiliary NPUP hydraulic pumps.

9. The aircraft of claim 4, further comprising a plurality of NPUP hydraulic pumps that are each coupled to one of the at least two NPUP generation sources.

10. The aircraft of claim 9, further comprising a plurality of auxiliary NPUP hydraulic pumps that are each driven by one of the at least two NPUP generation sources.

11. The aircraft of claim 1, further comprising a plurality of electric motor driven compressors (EMDCs) configured to provide compressed air to a plurality of environmental control systems (ECSs).

* * * * *